United States Patent
Sanchez

(10) Patent No.: US 11,518,391 B1
(45) Date of Patent: Dec. 6, 2022

(54) SYSTEMS AND METHODS FOR IDENTIFYING DISTRACTED DRIVING EVENTS USING SEMI-SUPERVISED CLUSTERING

(71) Applicant: BlueOwl, LLC, San Francisco, CA (US)

(72) Inventor: Kenneth Jason Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 276 days.

(21) Appl. No.: 16/883,388

(22) Filed: May 26, 2020

(51) Int. Cl.
*B60W 40/09* (2012.01)
*G06K 9/62* (2022.01)
*G06N 3/08* (2006.01)

(52) U.S. Cl.
CPC ........... *B60W 40/09* (2013.01); *G06K 9/6218* (2013.01); *G06K 9/6256* (2013.01); *G06N 3/08* (2013.01); *B60W 2540/229* (2020.02)

(58) Field of Classification Search
CPC ........... B60W 40/09; B60W 2540/229; G06K 9/6218; G06K 9/6256; G06N 3/08
See application file for complete search history.

(56) References Cited

U.S. PATENT DOCUMENTS

| | | | |
|---|---|---|---|
| 8,290,480 B2 | 10/2012 | Abramson et al. | |
| 8,768,286 B2 | 7/2014 | Naboulsi | |
| 9,398,423 B2 | 7/2016 | Cordova et al. | |
| 9,451,077 B2 | 9/2016 | Duvaut | |
| 10,115,164 B1* | 10/2018 | Binion | B60W 50/14 |
| 10,133,942 B2 | 11/2018 | Gleeson-May et al. | |
| 10,158,977 B2 | 12/2018 | Cordova et al. | |
| 10,250,611 B2 | 4/2019 | Herrmann et al. | |
| 10,358,142 B2 | 7/2019 | Joe et al. | |
| 10,365,117 B2 | 7/2019 | Harish et al. | |
| 11,386,676 B2* | 7/2022 | Yi | G06V 40/172 |
| 2004/0176083 A1 | 9/2004 | Shiao et al. | |
| 2016/0307285 A1 | 10/2016 | Gallagher | |
| 2018/0162275 A1* | 6/2018 | Pedersen | G08G 1/0116 |
| 2019/0005412 A1 | 1/2019 | Matus et al. | |

(Continued)

FOREIGN PATENT DOCUMENTS

CN 109815884 A 5/2019

*Primary Examiner* — Mohamed Barakat
(74) *Attorney, Agent, or Firm* — Faegre Drinker Biddle & Reath LLP

(57) ABSTRACT

A distracted driving analysis system for identifying distracted driving events is provided. The system includes a processor in communication with a memory device programmed to: (i) receive driving event records, each driving event record including phone usage by a user, wherein a driving event record is labeled as an actual distracted driving event or a passenger event, (ii) divide the driving event records into at least two clusters based at least in part upon common features and the labels of each driving event record by processing the plurality of driving event records with a semi-supervised machine learning algorithm, (iii) generate a trained model based at least in part upon the at least two clusters, (iv) process a new driving event using the trained model, (v) assign the new driving event to one of the clusters using the trained model, and/or (vi) determine whether the new driving event is an actual distracted driving event or a passenger event.

20 Claims, 10 Drawing Sheets

(56) References Cited

U.S. PATENT DOCUMENTS

| | | |
|---|---|---|
| 2019/0019351 A1* | 1/2019 | Harish .................. H04W 4/026 |
| 2019/0279009 A1* | 9/2019 | Srirangam Narashiman ............... G06T 7/74 |
| 2019/0279365 A1 | 9/2019 | Sakuma et al. |
| 2020/0290628 A1* | 9/2020 | Pinoteau .............. G06V 20/597 |
| 2020/0346658 A1 | 11/2020 | Deng et al. |
| 2021/0031687 A1 | 2/2021 | Kim |
| 2021/0142055 A1* | 5/2021 | Broggi .................... G08G 1/01 |
| 2021/0319332 A1 | 10/2021 | Isaac |

\* cited by examiner

SYSTEMS AND METHODS FOR IDENTIFYING DISTRACTED DRIVING EVENTS USING SEMI-SUPERVISED CLUSTERING

FIELD OF THE DISCLOSURE

The present disclosure relates to distracted driving events and, more particularly, to systems and methods for identifying distracted driving events using a variety of machine learning techniques, such as unsupervised, semi-supervised, and supervised machine learning techniques.

BACKGROUND

With the near ubiquity of smartphones, distracted driving (e.g., driving while simultaneously using a mobile computing device) is an ever-growing public safety concern. At least some systems may attempt to detect distracted driving by monitoring user phone usage and determining if the phone usage occurred while the user's vehicle was running or while the user was in a moving vehicle. In some cases, however, a user's phone may be utilized by a passenger while the user is operating his/her vehicle. Similarly, a user of a cell phone may simply be a passenger in a vehicle, and current systems may inaccurately determine that the user is partaking in distracted driving. As distracted driving may be related to a user's risk of personal injury or property loss, systems which attempt to quantify user risk or rely on an accurate measurement of user risk (e.g., an insurance system) would benefit from a more accurate identification of distracted driving behavior. A system, therefore, that more accurately and reliably identifies distracted driving events is needed.

BRIEF SUMMARY

The present embodiments may relate to systems and methods for identifying distracted driving events. The system may include a distracted driving analysis ("DDA") computer device, one or more user computer devices, one or more vehicles including vehicle sensors, an insurance company computer device, and a database.

In one aspect, a distracted driving analysis system for identifying distracted driving events is provided. The system includes one processor in communication with at least one memory device, and the at least one processor is programmed to: (i) receive a plurality of driving event records, each driving event record including phone usage by a user that occurred within a time period of a driving event associated with the user, wherein at least one of the plurality of driving event records is labeled as an actual distracted driving event or a passenger event, (ii) divide the plurality of driving event records into at least two clusters based at least in part upon common features and the labels of each driving event record by processing the plurality of driving event records with a semi-supervised machine learning algorithm, (iii) generate a trained model based at least in part upon the at least two clusters including cluster labels, (iv) process a new driving event using the trained model, (v) assign the new driving event to one of the at least two clusters using the trained model, and/or (vi) based at least in part upon the cluster labels for the assigned cluster, determine whether the new driving event is an actual distracted driving event or a passenger event. The computer system may include additional, less, or alternate functionality, including that discussed elsewhere herein.

In another aspect, a computer implemented method for identifying distracted driving events is provided. The method is carried out using a distracted driving analysis system including one processor in communication with at least one memory device. The computer-implemented method includes: (i) receiving a plurality of driving event records, each driving event record including phone usage by a user that occurred within a time period of a driving event associated with the user, wherein at least one of the plurality of driving event records is labeled as an actual distracted driving event or a passenger event, (ii) dividing the plurality of driving event records into at least two clusters based at least in part upon common features and the labels of each driving event record by processing the plurality of driving event records with a semi-supervised machine learning algorithm, (iii) generating a trained model based at least in part upon the at least two clusters including cluster labels, (iv) processing a new driving event using the trained model, (v) assigning the new driving event to one of the at least two clusters using the trained model, and/or (vi) based at least in part upon the cluster labels for the assigned cluster, determining whether the new driving event is an actual distracted driving event or a passenger event. The computer implemented method may include additional, less, or alternate actions, including those discussed elsewhere herein.

In another aspect, at least one non-transitory computer-readable storage media having computer-executable instructions embodied thereon for identifying distracted driving events is provided. When executed by a distracted driving analysis system including one processor in communication with at least one memory device, the computer-executable instructions cause the at least one processor to: (i) receive a plurality of driving event records, each driving event record including phone usage by a user that occurred within a time period of a driving event associated with the user, wherein at least one of the plurality of driving event records is labeled as an actual distracted driving event or a passenger event, (ii) divide the plurality of driving event records into at least two clusters based at least in part upon common features and the labels of each driving event record by processing the plurality of driving event records with a semi-supervised machine learning algorithm, (iii) generate a trained model based at least in part upon the at least two clusters including cluster labels, (iv) process a new driving event using the trained model, (v) assign the new driving event to one of the at least two clusters using the trained model, and/or (vi) based at least in part upon the cluster labels for the assigned cluster, determine whether the new driving event is an actual distracted driving event or a passenger event. The computer-executable instructions may provide additional, less, or alternate functionality, including that discussed elsewhere herein.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DRAWINGS

Figure 1:
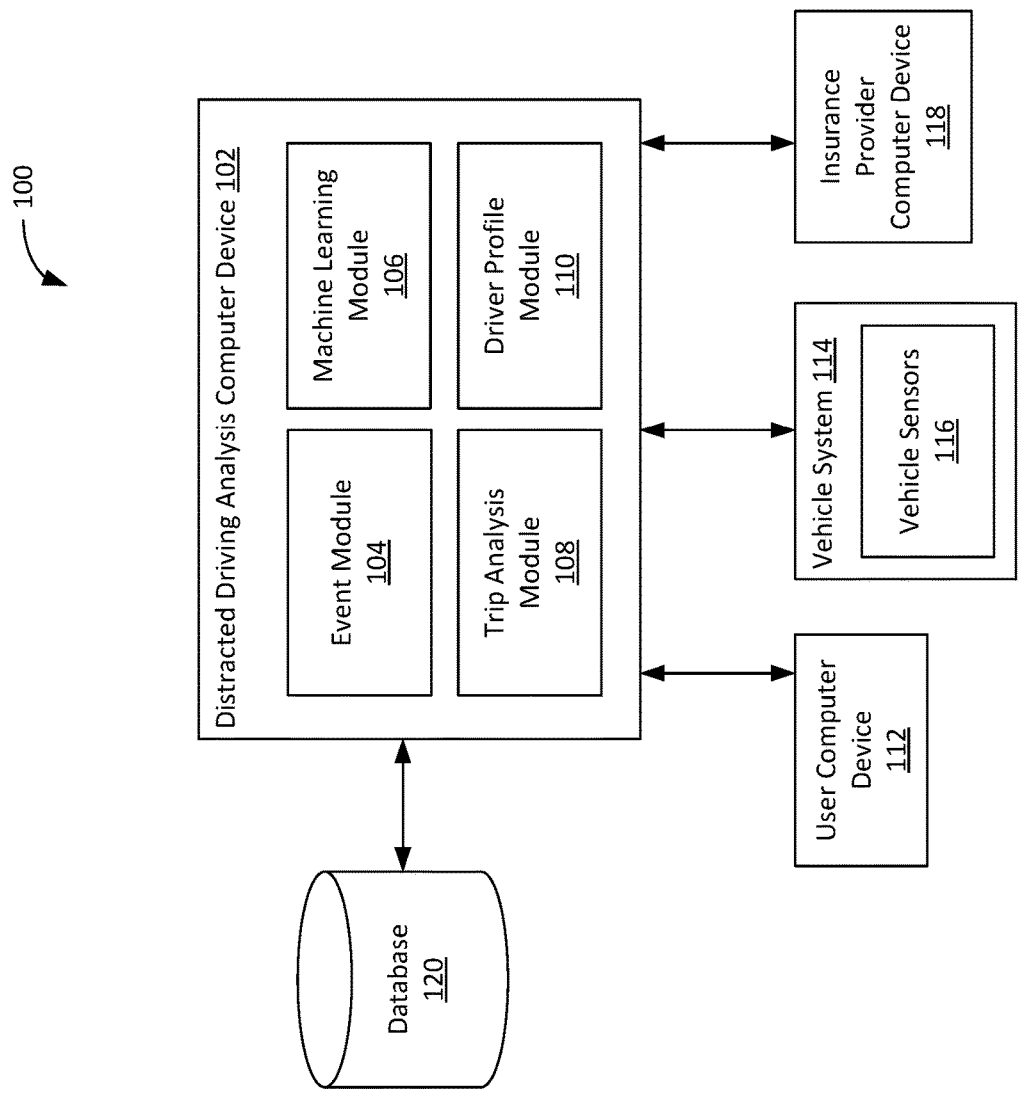
FIG. 1 illustrates a distracted driving analysis ("DDA") system for identifying distracted driving events using a distracted driving analysis ("DDA") computer device, according to various embodiments.

Embodiments of the present disclosure may relate to, inter alia, systems and methods for identifying distracted driving events using various machine learning techniques. More particularly, the present disclosure relates to a computer system, referred to herein as a distracted driving analysis ("DDA") computer system, that receives at least vehicle operation data and phone usage data, and utilizes at least one of an unsupervised machine learning technique, semi-supervised machine learning technique, and supervised machine learning technique to identify distracted driving events by analyzing the phone usage data and vehicle operation data.
Examples of Computer System for Analyzing Distracted Driving Events In an example embodiment, the systems and methods described herein are implemented using a DDA computer system, which includes a distracted driving analysis ("DDA") computer device. The DDA computer device is configured to utilize modules such as an event identification module, machine learning module, trip analysis module, and driver profile module to implement the functionalities described herein. The DDA computer system further includes one of a user computer device, a vehicle including one sensor, an insurance provider computer device, and a database, each of which is in communication with the DDA computer device. In alternative embodiments, the DDA computer system includes any number of the aforementioned components in any combination in communication with the DDA computer device. In alternative embodiments, any of the components may perform the tasks and functionalities of the other components as described herein.

In an example embodiment, the DDA computer device is configured to receive historical data, such as phone usage data and driving data, from a database for a variety of drivers and/or passengers, process the historical data using machine learning techniques and algorithms, and generate a trained model for identifying distracted driving events based at least in part upon output from the machine learning techniques and algorithms. For example, the DDA computer device may receive historical driving data such as sudden braking events, acceleration data, and lane-line compliance measurements. The DDA computer device may further receive phone usage data such as phone taps, an average tap rate, and applications accessed by a user. The DDA computer device may determine individual trips represented in the historical driving data (e.g., periods of time between a vehicle being turned on and being turned off) and determine phone usage that occurred during one of these trips by a user of the vehicle—these periods of phone usage during a driving trip may be referred to as potential distracted driving events. The DDA computer device may then use machine learning techniques to analyze available driving data and phone usage data associated with the potential distracted driving events to determine a model for predicting which potential distracted driving events are actual distracted driving events and which are passenger events.

As used herein, a "distracted driving event" refers to an instance of an operator of a vehicle (e.g., a driver) using, interacting with, or otherwise paying attention to a mobile computing device (e.g., a phone) while operating the vehicle (e.g., driving). For example, a distracted driving event may include actions performed by the driver of a vehicle such as unlocking a phone, viewing text messages, sending a text message, visiting a website, interacting with a phone application, placing a phone call, or any other use of a cell phone while driving.

As used herein, a "potential distracted driving event" refers to an instance of phone usage corresponding to a user within a vehicle in operation, where it's unclear whether the user of the phone was an operator or a passenger of the vehicle. In other words, potential distracted driving events include both distracted driving events (where the user of the phone is also operating the vehicle) and passenger events (where the user of the phone is a passenger in the vehicle).
Examples of Unsupervised Technique for Identifying Distracted Driving Events In one embodiment, the DDA computer device is configured to employ an unsupervised machine learning technique for identifying distracted driving events. In the example embodiment, the DDA computer device is configured to receive historical data, such as historical driving data and historical phone usage data, from a database and determine potential distracted driving events based at least in part upon the historical data. For example, DDA computer device may determine a potential distracted driving event based at least in part upon phone usage that occurs while a user is in a moving vehicle, which may be determined based at least in part upon text messages or other phone usage concurrent to the user being logged into a maps app or the user's GPS location changing at a relatively high velocity (e.g., the speed of a car). For the unsupervised machine learning technique, the historical data are not labeled as driver data or passenger data. Accordingly, it is not known if the historical data being clustered is driver data or passenger data.

In the example embodiment, the DDA computer device is configured to receive features inputs from a user, via a user computer device, where the features inputs indicate which features of the potential distracted driving events should be analyzed in order to categorize and organize the data. For example, a user may choose features for analysis such as sudden braking events, phone app usage, sudden acceleration events, collision events, phone angle, and text message data. In some embodiments, the features determined by the user may be compound features that include rates, ratios, or correlations between features. For example, the features inputs may include swipe to tap ratio, tap rate, and correlation between sudden braking events and phone usage.

The DDA computer device is configured to analyze a plurality of potential distracted driving events using a clustering machine learning algorithm and generate clusters of potential distracted driving events with similar and/or common features. Specifically, the DDA computer device may determine clusters such that the features of each event within a cluster are overall more similar to the features of other events in the cluster than those of events in other clusters. In one embodiment the user specifies how many clusters the data should be divided into, while in other embodiments the DDA computer device determines the clusters based at least in part upon processing the potential distracted driving events with the clustering algorithm. For example, after analyzing the driving events, the DDA computer device may divide the data into five separate clusters, with one cluster including potential driving events with both high correlation between sudden braking events and phone taps a low average tap rate, another cluster including potential driving events with a low correlation between sudden braking events and phone taps and a high average tap rate, and so on.

In the example embodiment, the DDA computer device is configured to transmit the clustered data to a user and receive cluster qualifications (also referred to herein as cluster labels) input from the user via a user computer device. Cluster qualifications are input from a user that indicates whether the data points in the cluster indicate actual distracted driver events or passenger events. In alternative embodiments, the specific cluster qualifications may include any useful distinctions within the data. For example, a user may determine that a first cluster, which contains events with a high correlation between sudden braking events and phone taps, likely indicates events which are actual distracted driver events. As another example, a user may determine that a second cluster, which contains consistent phone taps uncorrelated with sudden braking events, likely contains events which are passenger events.

In the example embodiment, the DDA computer device is further configured to determine a confidence level associated with the label of each cluster. In one embodiment, the DDA computer device determines how likely it is that each event in the cluster matches the cluster qualification (e.g., passenger event or distracted driver event) and assigns a confidence label to the cluster based at least in part upon the likelihood.

In the example embodiment, the DDA computer device is configured to train a model based at least in part upon the clustered data and cluster qualifications, such that the trained model is able to receive novel inputs, determine which cluster each novel input matches, and assign the cluster to the data input. For example, the DDA computer device may train a model, receive a novel potential distracted driving event, and use the model to determine which cluster the potential distracted driving event belongs to, and therefore, how likely it is that the potential distracted driving event is an actual distracted driving event or a passenger event.

In the example embodiment, the DDA computer device is further configured to categorize a plurality of novel potential distracted driving events associated with a particular user and utilize the categorized events to generate a driver profile. In one embodiment, the DDA computer device calculates a driver score for the user based at least in part upon the categorized events or calculations and statistics related to the categorized events. For example, the DDA computer device may determine an average number of distracted driving events associated with a user in a given month and give a safety score to the user based at least in part upon the average number.

In the example embodiment, the DDA computer device is further configured to transmit the driver profile to an insurance provider computer device, such that the insurance provider computer device may generate an insurance policy for the user. In one embodiment, the DDA computer device is further configured to generate insurance policies or insurance policy suggestions based at least in part upon the driver profile.

Examples of Semi-Supervised Technique for Identifying Distracted Driving Events

In one embodiment, the DDA computer device is configured to apply a semi-supervised machine learning technique for identifying distracted driving events. In the example embodiment, the semi-supervised approach is similar to the unsupervised approach.

In the example embodiment, unlike in the unsupervised approach, the historical input data in the semi-supervised approach (e.g., historical driving data, historical phone usage data, and historical potential distracted driving events) further includes a portion of labeled data. In one embodiment, at least a portion of the historical input data in the semi-supervised approach is labeled such that the user is labeled as "passenger" or "vehicle operator" during trips represented in the historical driving data or associated with phone usage in the historical phone usage data. In another embodiment, historical potential distracted driving events are labeled as "passenger events" or "distracted driving events".

In the example embodiment, the DDA computer device is configured to use the data labels as additional features used for clustering data. Specifically, the DDA computer device is configured to use a clustering algorithm to divide the potential distracted driving events into clusters, and the labels, such as "passenger event" or "distracted driving event", are used as a feature to assist in clustering.

In the example embodiment, the DDA computer device is configured to display the data labels within the clusters to the user via a user computer device, such that the cluster qualifications provided by the user may be more accurate. Specifically, a user may be asked to qualify clusters as either "passenger events" or "distracted driving events", and by reviewing the features common to events within a cluster, including the data labels of events within the cluster, the user may more easily and more accurately identify a qualification for the cluster. For example, a user may easily qualify a cluster as indicating "passenger events" if multiple events in the cluster included labeled data for "passenger" and/or "passenger event".

In one embodiment, the DDA computer device is configured to automatically qualify the clusters based at least in part upon data labels contained within the clusters. As described above, the DDA computer device is configured to divide the potential distracted driving events into clusters based at least in part upon similarities in features, and if a high enough number, percentage, or portion of the events contain the same data label, the DDA computer device may be configured to automatically qualify the cluster to match the data label. For example, the DDA computer device may determine that 10% of the data points within a cluster are labeled, and all of the labels match "passenger" or "passenger event". The DDA computer device may then determine, to a certain degree of confidence, that the events in the cluster are related to passenger events.

Examples of Supervised Technique for Identifying Distracted Driving Events

In one embodiment, the DDA computer device is configured to apply a supervised machine learning technique for identifying distracted driving events. In the example embodiment, DDA computer device is configured to receive labeled training data and train a model using supervised machine learning algorithms. The DDA computer device is configured to use the trained model to analyze and categorize potential distracted driving events related to a user and generate a driver profile for the user based at least in part upon identified passenger events and distracted driving events.

In the example embodiment, labeled training data include historical data, such as historical driving data, historical phone usage data, and potential distracted driving events. The labeled training data also includes labels qualifying certain aspects of the historical data. In alternative embodiments, the labeled training data include labels indicating whether phone usage is conducted by a user who is a "passenger" or "vehicle operator", whether a driving trip includes a "distracted driver" or "non-distracted driver", and/or whether potential distracted driving events are "passenger events" or "distracted driving events". In alternative embodiments, the labeled training data include any of the above-referenced labels in any combination, and may include additional or alternative labels.

In the example embodiment, the DDA computer device analyzes the labeled training data in order to identify patterns and "learn" features that are predictors for the labels of the data. For example, the DDA computer device may analyze labeled training data and determine that certain driving data (e.g., sudden braking events), certain text usage data (e.g., swipe rate), or a combination of the two (e.g., swerving in and out of a lane coupled with a simultaneous string of phone taps) are strongly correlated with a particular label (e.g., distracted driving events). In some embodiments, the DDA computer device identifies features and patterns in the data that aren't readily recognized or understood by a user. Based at least in part upon the identified features and patterns in the labeled training data, the DDA computer device trains a model capable of predicting distracted driving events and passenger events based at least in part upon novel input data.

Examples of Use of Auto-Encoding and Embedding

In one embodiment, the DDA computer device utilizes an auto-encoding and embedding method as part of the semi-supervised or supervised approaches for identifying distracted driving events. Specifically, the DDA computer device is configured to convert a plurality of data inputs into a coordinate n-dimension coordinate, where n may be any number needed for accurately representing all possible data points representing in the input data. For example, if the input data include sensor readings from an accelerometer, a gyroscope, a magnetometer, a thermometer, a speedometer, and a barometer, the DDA computer device may represent a reading at a given period of time as a 7 dimensional coordinate, with 6 dimensions corresponding to readings from each sensor device and 1 dimension corresponding to time (which may come from a clock). In some embodiments, the DDA computer device is further configured to reduce the dimensionality of input data using an auto-encoding technique, such as a neural network, such that the output of the auto-encoding technique uniquely represents the input with higher data density. For example, multiple sensor readings or singular data points may be converted into a single higher level feature that accurately represents a particular state of those lower-level data points.

The DDA computer device is further configured to embed auto-encoded data in a meaningful way, such that similar vectors (e.g., distances and directions) between pairs of points in different regions of the coordinate system still represent similar changes to the system. In other words, similar vectors in the embedded coordinate system, regardless of where in the system the vectors are located, represent similar changes in a corresponding physical system.

In the example embodiment, the DDA computer device is configured to receive historical driving data and historical phone usage data, auto-encode and embed the historical data, and cluster data points based at least in part upon at least one of their locations within the auto-encoded coordinate system and vectors between different data points in different points in time. The DDA computer device is further configured to receive user input qualifying the vectors, data points, and/or clusters as representing distracted driving events or passenger events. For example, a region of a coordinate system may be clustered together, and the clustered results displayed to a user. The user may notice that a relatively high portion of the results include "passenger" as a label and qualify the data cluster as representing passenger events.

Examples of Distracted Driver Analysis Computer System

FIG. 1 depicts a distracted driving analysis ("DDA") system 100 for identifying distracted driving events. In an example embodiment, DDA system 100 includes a distracted driving analysis ("DDA") computer device 102. In some embodiments, DDA computer device 102 utilizes modules such as an event module 104, a machine learning ("ML") module 106, a trip analysis module 108, and a driver profile module 110. In alternative embodiments, DDA computer device 102 is in communication with any of a user computer device 112, a vehicle system 114 including vehicle sensors 116, an insurance provider computer device 118, and a database 120. In alternative embodiments, DDA computer system 100 may include any number of the aforementioned components in any arrangement and in communication with DDA computer device 102.

In the example embodiment, DDA computer device 102 is configured to receive historical data including historical driving data and historical phone usage data, train a machine learning model using the historical data, and utilize the trained machine learning model to analyze potential distracted driving events and identify distracted driving events based at least in part upon user driving data and user phone usage data. DDA computer device 102 is further configured to generate a user profile, which may be used for generating insurance policies, based at least in part upon identified and potential distracted driving events.

In the example embodiment, DDA computer device 102 is configured to utilize event module 104 to identify potential distracted driving events based at least in part upon historical driver data and historical phone usage data received from database 120. In alternative embodiments, historical data received from database 120 is labeled training data or unlabeled data. DDA computer device 102 is further configured to utilize ML module 106 to process the historical data using a machine learning algorithm. In alternative embodiments, ML module 106 may employ unsupervised, supervised, or semi-supervised machine learning techniques. ML module 106 is configured to generate a trained machine learning model, and trip analysis module 108 is configured to utilize the trained machine learning model to determine distracted driving events or passenger events from user driving data and user phone usage data. Driver profile module 110 is configured to utilize the outputs from trip analysis module 108 to generate a user profile, which may include a driver score or a potential driver insurance policy.

In the example embodiment, user computer device 112 may be any computer device that can be operated by a user, such as a cell phone, smart phone, laptop, tablet, desktop, or any other mobile or stationary user computer device. In the example embodiment, DDA computer device 102 may provide a web portal or application to user computer device 112 such that a user is able to interact with DDA computer system 100 via user computer device 112. In one embodiment, DDA computer device 102 receives user personal data, input by a user, via user computer device 112. In another embodiment, DDA computer device 102 receives user phone usage data and/or user driving data from user computer device 112. For example, user computer device 112 may be a smartphone, and user driving data regarding the route of a user's trip may be recorded through the GPS of user computer device 112 and sent to DDA computer device 102. As another example, user computer device 112 may be a smartphone, and user phone usage data regarding the number of taps and swipes of the phone over a given time period may be recorded and sent to DDA computer device 102.

In the example embodiment, DDA computer device 102 is configured to communicate with vehicle system 114, which includes vehicle sensors 116. Vehicle system 114 may be any computer system that manages, monitors, or is otherwise associated with at least one vehicle. In one embodiment, vehicle system 114 is a central computer system that monitors the status of different aspects of the vehicle through vehicle sensors 116. Vehicle sensors 116 may be any sensors that collect data associated with a vehicle or the environment surrounding a vehicle. For example, vehicle sensors 116 may include an accelerometer, a speedometer, a gyroscope, wheel alignment sensors, brake sensors, proximity sensors, cameras, audio sensors, LIDAR, radar, or sonar sensors, passenger or operator monitoring sensors, internal or external thermometers or barometers, or any other sensors associated with a vehicle. In the example embodiment vehicle system 114 collects data associated with a vehicle through vehicle sensors 116 and transmits the data to DDA computer device 102. This vehicle-associated data may be a component of historical driving data and/or user driving data.

In the example embodiment, DDA computer device 102 is configured to communicate with insurance provider computer device 118. Insurance provider computer device 118 may be any computer device associated with an insurance provider, such as a third party insurance provider or an insurance provider associated with DDA system 100. DDA computer device 102 is configured to analyze user driver data and user phone usage data in order to determine distracted driving events, generate a user driving profile, and transmit the user driving profile to insurance provider computer device 118. Insurance provider computer device 118 is configured to utilize the data provided by DDA computer device 102 to generate insurance policies for a user based at least in part upon the user driving profile. In some embodiments, DDA computer device 102 determines potential insurance policies based at least in part upon the user driver profile and transmits the potential insurance policies to insurance provider computer device 118. In alternative embodiments, insurance provider computer device 118 is incorporated in DDA computer device 102, operated by the same party that operates DDA computer device 102, or is third party computer device external to DDA system 100.

In the example embodiment, DDA computer device 102 is configured to communicate with database 120. DDA computer device 102 is configured to receive any data from database 120 needed for performing the functionalities described herein. DDA computer device 102 is further configured to store any of the data described herein, or any other data received and/or generated by DDA computer device 102, in database 120. In alternative embodiments, database 120 is external to DDA computer device 102 and accessed through a database server or internal to DDA computer device 102. In the example embodiment, DDA computer device 102 further includes a local memory capable of storing locally any data received from database 120.

Figure 2:
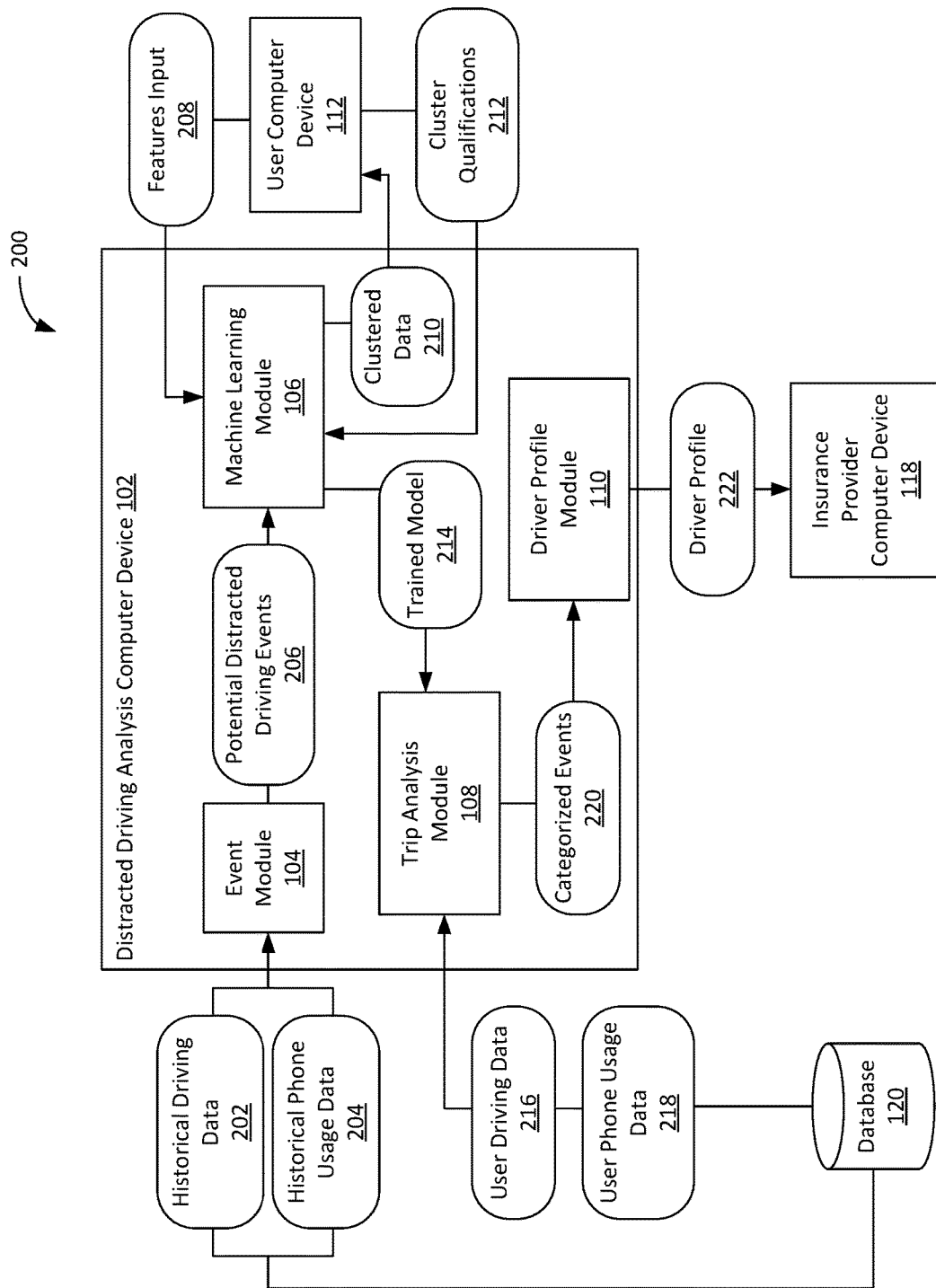
FIG. 2 illustrates a data flow for identifying distracted driving events using the DDA system of FIG. 1 and unsupervised and semi-supervised machine learning techniques, according to various embodiments.

Examples of Data Flow for Unsupervised and Semi-Supervised Techniques for Identifying Distracted Driving Events FIG. 2 depicts an exemplary data flow 200 for identifying distracted driving events using DDA system 100 (shown in FIG. 1) and unsupervised and semi-supervised machine learning techniques. In the example embodiment, DDA computer device 102 is configured to receive historical data, such as historical driving data 202 and historical phone usage data 202, from database 120. Using event module 104, DDA computer device 102 is configured to determine potential distracted driving events 206 from historical driving data 202 and historical phone usage data 204. DDA computer device 102 is configured to receive features input 208 from user computer device 112 and utilize ML module 106 to cluster potential distracted driving events 206 into clustered data 210 by processing distracted driving events 206 using an unsupervised or semi-supervised clustering algorithm based at least in part upon features defined in features input 208. DDA computer device 102 is further configured to receive clusters qualifications 212 from user computer device 112 qualifying the clusters as either representing "vehicle operator" or "passenger" clusters based at least in part upon similar features of data points within each cluster. Machine learning module 106 is configured to define a trained machine learning ("ML") model 214 based at least in part upon the qualified clusters and transmit trained ML model 214 to trip analysis module 108. Trip analysis module 108 is configured to receive user data, such as user driving data 216 and user phone usage data 218, from database 120 and analyze the user data using trained ML model 214 to determine potential distracted driving events and identify distracted driving events and passenger events represented by the data. Trip analysis module 108 is configured to generate categorized events 220 based at least in part upon the analysis of the user data and transmit categorized events 220 to driver profile module 110. Driver profile module 110 is configured to generate a user driving profile 222 based at least in part upon categorized events 220 and transmit driver profile 222 to insurance provider computer device 118.

In the exemplary embodiment, DDA computer device 102 is configured to receive historical data, such as historical driving data 202 and historical phone usage data 204, from database 120. In alternative embodiments, DDA computer device 102 receives any of the historical data from any combination of database 120, user computer device 112, and vehicle system 114 (both shown in FIG. 1). In an alternative embodiment, DDA computer device 102 receives the historical data from a third part server or device.

In the example embodiment, historical driving data 202 includes one piece of data associated with the operation of at least one vehicle by at least one driver. Historical driving data 202 may include, but is not limited to, data collected by vehicle sensors (e.g., acceleration data, velocity data, turning or cornering data, braking data, gas usage data, internal or external temperature or pressure data, lane-line compliance data, sudden braking or acceleration events, GPS location, collision data, and tire rotation data, among others), data collected by a vehicle operating system (e.g., gas usage data, radio or other electronic systems usage, air conditioner usage, window usage, car gear information, and sport-mode usage, among others), and data collected by a mobile computer device through an application or otherwise (e.g., GPS location, trip information through a mapping application, trip information through an insurance application, acceleration data, velocity data, gyroscope data, vibration data, sudden braking or acceleration data, among others).

In the example embodiment, historical phone usage data 204 includes one piece of data associate with usage of a mobile computing device by at least one user. Historical phone usage data 204 may include, but is not limited to, application-related data (e.g., specific application used and at what times, the type and nature of usage of each application, phone taps and/or swipes within a specific application, among others), texting data (e.g., logged keystrokes, messaging data sent via a messaging application including message text, recipient, time, among others), and general phone usage data (e.g., accelerometer and gyroscope data, taps, swipes, and other gesture inputs, among others).

In the example embodiment, event module 104 is configured to receive historical driving data 202 and historical phone usage data 204 and determine potential distracted driving events 206. Potential distracted driving events 206 include events during which a user used his/her phone while in a moving vehicle. Some potential distracted driving events 206 may be actual distracted driving events, where the user is using a phone while simultaneously operating a vehicle. Other potential distracted driving events 206 may be passenger events, where a user of a mobile phone is merely a passenger in a vehicle being operated by another individual or autonomously.

In the example embodiment, event module 104 is configured to compare historical driving data 202 and historical phone usage data 204 and determine phone usage occurring during a driving trip. Such phone usage occurring during a driving trip (e.g., phone usage by a user in a vehicle) may be considered potential distracted driving events 206. In some embodiments, event module 104 is configured to determine potential distracted driving events 206 based at least in part upon timestamps within historical driving data 202 and historical phone usage data 204.

For example, text messages sent by a user may have time stamps indicating times occurring during a driving trip tracked by a GPS location app (e.g., a maps-type app). As another example, phone usage such as logged swipes and taps may correspond to accelerations and/or speeds associated with driving in a vehicle. Event module 104 may determine these relationships between historical driving data 202 and historical phone usage data 204 to determine potential distracted driving events 206. In one embodiment, event module 104 determines timestamps for driving trips based at least in part upon historical driving data 202 then determines phone usage that falls within the timestamps of a trip. For example, based at least in part upon historical driving data 202 that indicates a car was turned on, the car was driven for a period of time, and the care was turned off, event module 104 may define a driving trip as the period during which the car was on. Event module 104 may further determine phone usage data 204 that falls within the driving trip, and label that phone usage data 204 as a potential distracted driving event 206.

In an alternative embodiment, potential distracted driving events 206 are received from database 120, such that event module 104 does not need to specifically derive potential distracted driving events 206 from the historical data. In an alternative embodiment, event module 104 receives historical driving data 202 and historical phone usage data 204 in a format such that the two types of historical data correspond to potential distracted driving events; that is, the historical driving data 202 and historical phone usage data 204 received by event module 104 include only phone usage data which occurs in the midst of a driving trip as recorded or determined by a third party system. In an alternative embodiment, at least one of historical driving data 202, historical phone usage data 204, an potential distracted driving events 206 include a label indicating whether a particular user is a "passenger" or "operator" of a vehicle.

In the example embodiment, ML module 106 receives potential distracted driving events 206 from event module 104 and utilizes an unsupervised or a semi-supervised machine learning approach for clustering the potential distracted driving events 206 based at least in part upon particular features defined by the user. In one embodiment, ML module 106 receives features input 208 from user computer device 112, where features input 208 defines specific features, or data, by which ML module 106 will cluster or organize potential distracted driving events 206. Features input 208 may include, but is not limited to, any of the data discussed above (e.g., acceleration data, speedometer data, braking data, tap and swipe data, texting data, among others). Features input 208 may further include compound features which combine multiple data types or represent relationships between data types. For example, features input 208 may include a ratio of two data types (e.g., tap to swipe ratio), a rate of an occurrence over time (e.g., taps per minute or sudden brake events per minute), or other user-defined relationships (e.g., correlation between sudden braking events and phone taps, or a correlation between phone taps and vehicle acceleration).

In an alternative embodiment, ML module 106 determines features inputs automatically based at least in part upon available historical data. For example, the features determined by ML module 106 may include some or all of the data types available within historical driving data 202 and/or historical phone usage data 204. ML module 106 may further determine compound features by calculation rates, ratios, or other relationships within historical data as described above.

In one embodiment, ML module 106 is configured to use an unsupervised machine learning technique to sort potential distracted driving events 206 into clusters based at least in part upon features defined in features input 208, thereby generating clustered data 210. In general, ML module 106 determines clusters such that the data points contained in a given cluster are more similar to other data points in that cluster than to data points in any other cluster. The similarities between data points may be determined based at least in part upon similarities or differences between the features of each potential distracted driving event 206. For example, features may include "average tap rate", "tap to swipe ratio", "amount of sudden braking events", "phone usage correlated to acceleration events", and potential distracted driving events may be clustered based at least in part upon these features. Clusters may be determined, such that events with high tap rate and low correlation between phone usage and acceleration events are grouped together, events with a high amount of sudden brake events and high swipe to tap ratio are grouped together, and the like.

In one embodiment, features input 208 includes a number of buckets into which ML module 106 should sort data (e.g., a number of clusters in which to sort data). For example, features input 208 may specify clustering the data into five different buckets. In another embodiment, ML module 106 automatically determines the number of clusters into which to divide the data based at least in part upon the features of the data. For example, ML module 106 may determine that there are six different "clusters" into which each potential distracted driving events 206 falls when events are clustered based at least in part upon the features. In alternative embodiments, ML module 106 is configured to utilize at least one of K-means clustering, affinity propagation, mean shift, spectral clustering, ward, agglomerative clustering, DBSCAN, birch, and Gaussian mixtures, among other types of clustering algorithms.

In the example embodiment, ML module 106 transmits clustered data 210 to user computer device 112 and receives cluster qualifications 212 from user computer device 112, which includes manual input denoting whether each cluster likely indicates a distracted driving event or a passenger event. Specifically, DDA computer device 102 displays clustered data 210 to a user via user computer device 112 and enables a user to provide qualitative input for whether the cluster likely indicates a distracted driving event or passenger event. Continuing the example above, a cluster that includes events with a high tap rate and a low correlation between phone usage and acceleration events may indicate passenger events (e.g., high tap rate may indicate a user is able to focus more attention on the phone and low correlation between phone usage and acceleration events may indicate the user is simply operating a phone without being in control of the vehicle). Similarly, a cluster with a high amount of sudden braking and a low tap rate may indicate the events are distracted driving events (e.g., the vehicle operator is distracted and thus is often needed to brake suddenly, and the user is tapping at a reduced rate due to some attention being on the road).

In one embodiment, features inputs 208 are determined such that a user may be able to more easily determine cluster qualifications 212; that is, the DDA computer device 102 may cluster groups according to features that are more easily understood by a user and may enable more reliable cluster qualifications 212 indicating whether each cluster includes passenger events or distracted driving events.

In the example embodiment, ML module 106 may further determine a confidence level associated with the qualified clustered data based at least in part upon clustered data 210 and cluster qualifications 212. Specifically, ML module 106 may assign a probability, likelihood, or confidence measurement that an event within a cluster actually represents the qualification assigned to that cluster. For example, a confidence measurement for a cluster qualified as "distracted driving event" may indicate a 70% confidence that each event in the cluster is a distracted driving event. In alternative embodiments, ML module 106 may determine a specific confidence level for each event within a cluster based at least in part upon the location of the event within the cluster. For example, a cluster qualified as a "passenger events" may indicate 90% probability that events within a certain area of the cluster are passenger events, while events within a separate area of the cluster indicate a 70% probability.

In one embodiment, ML module 106 is configured to utilize a semi-supervised machine learning approach which includes labels on a portion (or all) of the data input into ML module 106 (e.g., historical driving data 202, historical phone usage data 204, and potential distracted driving events 206). Specifically, the labels on the data indicate whether phone usage is by a passenger or operator of a vehicle. Generally speaking, in the semi-supervised approach the addition of labels to the data inputs enables a higher reliability in the qualifications of each cluster (e.g., more likely that the "passenger event" or "distracted driving event" qualification for each cluster is accurate) and may enable a higher confidence level that each event within the cluster conforms to the cluster qualification (e.g., more data enables more precise clustering and a higher likelihood that each event in the cluster is accurately described by the cluster qualification).

In a semi-supervised embodiment, labels indicating whether a user is a passenger or a vehicle operator for a given trip are included in the data inputs for ML module 106 and the labels are also included as a feature by which ML module 106 clusters the events. Specifically, along with various elements of historical driving data 202, historical phone usage data 204, and rates, ratios, and correlations associated with the historical data, the data labels of "passenger" or "vehicle operator" are included as features. ML module 106, then, determines clustered data 210, which also includes the data labels, thereby making it easier for a user to apply cluster qualifications 212. Specifically, ML module 106 displays clustered data 210 via user computer device 112, and the data labels may make it easier for a user to qualify each cluster (e.g., as "passenger events" or "distracted driving events").

In some embodiments, ML module 106 is qualifies the clusters automatically based at least in part upon the labeled data. In one embodiment, if a high enough percentage of potential distracted driving events 206 within a particular cluster have a specific label, ML module 106 may automatically qualify that cluster according to that label. For example, if 30% of the data within a cluster includes the label "passenger", ML module 106 may qualify that cluster as a "passenger event" cluster. In alternative embodiments, ML module 106 may automatically qualify a cluster according to a ratio of data labels within a cluster. For example, if there are five times as many "vehicle operator" labels as "passenger" labels within a cluster, ML module 106 may automatically qualify the cluster as "distracted driving events". In an alternative embodiment, ML module 106 suggests cluster qualifications to a user and enables the user to confirm or change the qualification via user computer device 112.

In the example semi-supervised embodiment, ML module 106 may assign a confidence level to a cluster based at least in part upon the data labels within the cluster. Specifically, based at least in part upon a ratio of data labels or the percentage of events with a given data label, ML module 106 may determine a probability or confidence level that an event in the cluster is actually represented by the qualification of the cluster. For example, if 30% of the potential distracted driving events 206 in a cluster are labeled "passenger" and 1% of the events in the cluster are labeled "driver", ML module 106 may qualify the cluster as "passenger events" (either automatically or based at least in part upon user input) and may further determine a 95% confidence level that potential distracted driving events in the cluster are passenger events.

In the example embodiment, ML module 106 is configured to generate a trained model 214 based at least in part upon clustered data 210 and cluster qualifications 212. Specifically, ML module 106 generates trained model 214 such that trained model 214 is configured to process novel data and determine which of the pre-determined clusters the novel data belongs to. For example, trained model 214 may place an event in a cluster based at least in part upon the features of the event. In one embodiment, ML module 106 generates trained model 214 from an untrained model by defining elements and coefficients based at least in part upon clustered data 210 and cluster qualifications 212. For example, ML module 106 may define undefined or under-defined coefficients in a function in order to generate trained model 214. In another embodiment, ML module 106 generates trained model 214 without using an untrained model. ML module 106 is further configured to transmit trained model 214 to trip analysis module 108.

In the example embodiment, trip analysis module 108 is configured to receive user data, such as user driving data 216 and user phone usage data 218, and utilize trained model 214 to categorize user potential distracted driving events represented in the user data. Specifically, trip analysis module 108 is configured to identify user potential distracted driving events based at least in part upon user driving data 216 and user phone usage data 218 and generate categorized events 220 by using trained model 214 to assign a cluster to each user potential distracted driving event. For example, trip analysis module 108 may identify potential distracted driving events based at least in part upon user phone usage data 218 that takes place within a driving trip represented in user driving data 216. Trip analysis module 108 may then utilize trained model 214 to assign a cluster to the potential distracted driving event based at least in part upon the features of the potential distracted driving event.

In one embodiment, trip analysis module 108 generates categorized events 220 such that each user potential distracted driving event is assigned a cluster previously identified by ML module 106 in clustered data 210. In another embodiment, trip analysis module 108 generates categorized events 220 such that each user potential driving event is categorized as "distracted driving event" or "passenger event" based at least in part upon the cluster it is assigned by trained model 214. In one embodiment, trip analysis module, via trained model 214, assigns a confidence level to each event in categorized events 220 based at least in part upon how closely the event resembles a specific cluster and/or the confidence level assigned to that cluster for predicting "distracted driving event" or "passenger event".

In an alternative embodiment, event module 104 is configured to analyze user driving data 216 and user phone usage data 218 to determine user potential distracted driving events, as described above with reference to determining potential distracted driving events 206. In an alternative embodiment, trip analysis module 108 is configured to receive any of user driving data 216, user phone usage data 21, and user potential distracted driving events from at least one of database 120 and user computer device 112.

In the example embodiment, driver profile module 110 is configured to receive categorized events 220 from trip analysis and generate driver profile 222 based at least in part upon categorized events 220. Specifically, driver profile module 110 is configured to construct driver profile 222 for a particular user based at least in part upon at least one of categorized events 220 associated with the user, user driving data 216 associated with the user, user phone usage data 218 associated with the user, and any other data associated with the user, such as profile, demographic, or identification information.

In one embodiment, driver profile module 110 is configured to generate statistics or calculated outputs based at least in part upon any of the information mentioned above, such that drive profile 222 may include additional statistics or calculations related to the user and the user's driving tendencies. For example, driver profile module 110 may receive a plurality of categorized events for a particular user and determine what percentage of the user's potential distracted driving events are passenger events vs distracted driving events, how many distracted driving events the user averages per month, and the average length of the user's distracted driving events.

In another embodiment, driver profile module 110 determines qualitative aspects of a user's behavior based at least in part upon any of the information associated with a user. In one embodiment, driver profile module 110 determines a driver score for the user and includes the driver score in driver profile 222. Driver profile module 110 may determine driver profile 222 in a number of ways, including, but not limited to, comparing a user's information to a body of other user information and determining a relative safety/risk of the user, comparing a user's behavior to pre-determined safety standards, and determining historical accident data associated with similar user data and behavior. For example, driver profile module 110 may determine a safety score for a user based at least in part upon data such as number of distracted driving events per month, average number of distracted driving events per trip, ratio of distracted driving events to passenger events, length of average distracted driving events, type of distracted driving events, average sudden brake events per trip, or any other driving data, phone usage data, or categorized events associated with the user.

In the example embodiment, driver profile module 110 is configured to transmit driver profile 222 to insurance provider computer device 118, such that insurance provider computer device 118 is able to generate an insurance policy for a user associated with driver profile 222. In alternative embodiments, driver profile module 110 is configured to determine an insurance policy for a user based at least in part upon driver profile 222, update a current insurance policy, or generate suggestions for an insurance provider.

Figure 3:
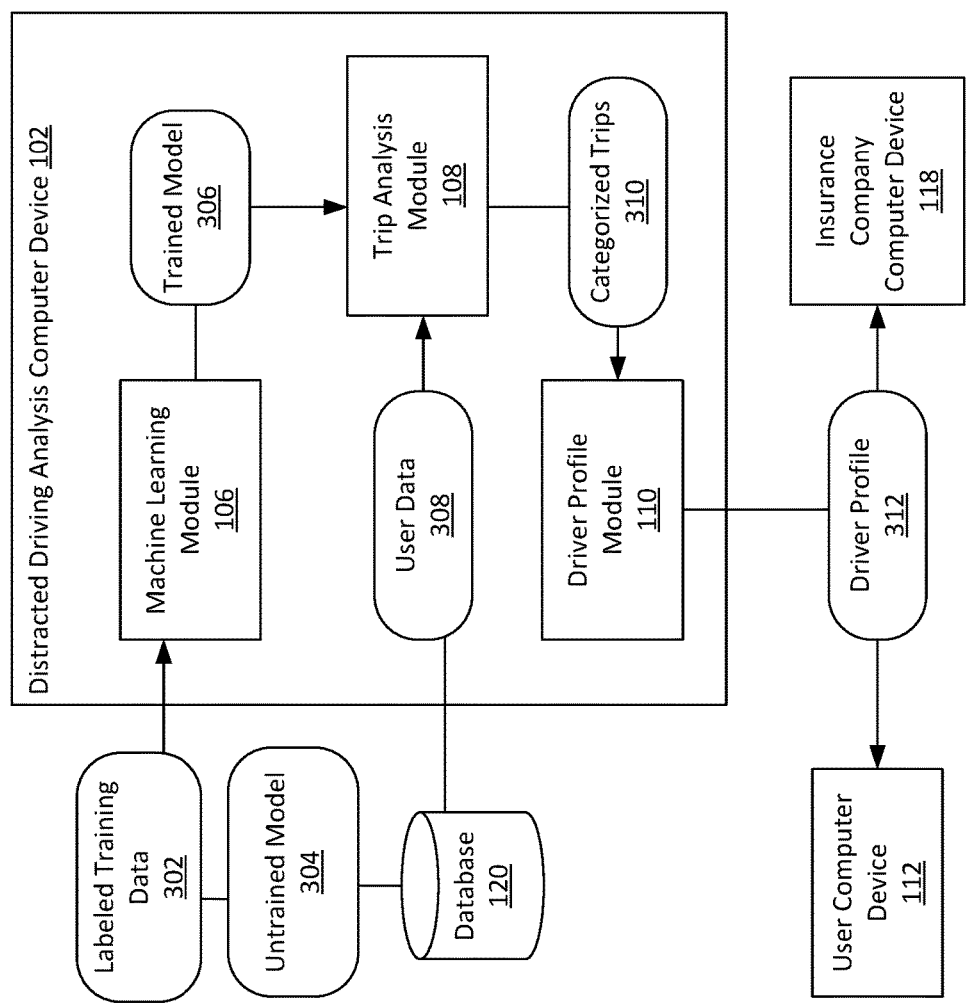
FIG. 3 illustrates a data flow for a supervised approach to identifying distracted driving events using the DDA system of FIG. 1, according to various embodiments.

Examples of Data Flow for a Supervised Approach for Identifying Distracted Driving Events FIG. 3 depicts a data flow 300 for a supervised approach for identifying distracted driving events using distracted driving analysis ("DDA") system 100 (shown in FIG. 1). In the example embodiment, distracted driving analysis ("DDA") computer device 102 is configured to receive labeled training data 302 and use training data 302 to train a model using supervised machine learning algorithms. DDA computer device is configured to use the trained model to analyze and categorize potential distracted driving events related to a user and generate a driver profile 312 for the user based at least in part upon identified passenger events and distracted driving events.

In the example embodiment, distracted driving analysis machine learning ("ML") module 106 is configured to receive labeled training data 302 and an untrained model 304 from database 120. In some embodiments, untrained model 304 includes functions, mathematical models, and the like with undefined or partially defined function elements or coefficients. ML module 106 is configured to process labeled training data 302 using machine learning methods and algorithms in order to define the elements of untrained model 304 (described in more detail with reference to FIG. 4 below).

In the example embodiment, labeled training data 302 includes historical data, such as historical driving data and historical phone usage data, which may be similar to the historical data described with reference to FIG. 2. Labeled training data 302 also includes labels qualifying certain aspects of the historical data. In alternative embodiments, labeled training data 302 includes labels indicating whether phone usage is conducted by a user who is a "passenger" or "vehicle operator", whether a driving trip includes a "distracted driver" or "non-distracted driver", and/or whether potential distracted driving events are "passenger events" or "distracted driving events". In alternative embodiments, labeled training data 302 includes any of the above-referenced labels in any combination, and may include additional or alternative labels.

In the example embodiment, ML module 106 analyzes labeled training data 302 in order to identify patterns and "learn" features that are predictors for the labels of the data. For example, ML module 106 may analyze labeled training data and determine that certain driving data (e.g., sudden braking events), certain text usage data (e.g., swipe rate), or a combination of the two (e.g., swerving in and out of a lane coupled with a simultaneous string of phone taps) are strongly correlated with a particular label (e.g., distracted driving events). In some embodiments, ML module 106 identifies features and patterns in the data that aren't readily recognized or understood by a user. Based at least in part upon the identified features and patterns in labeled training data 302, ML module 106 further defines the function elements of untrained model 304 in order to generate trained model 306 (a process described in more detail with reference to FIG. 4 below).

In one embodiment, labeled training data 302 includes a label for whether phone usage data are conducted by a "non-operator" or "vehicle operator". In some embodiments, a "non-operator" may indicate a passenger when the phone usage data are known to occur within a vehicle. ML module 106 is configured to determine patterns in historical phone usage data that differ for vehicle operators and non-operators. For example, vehicle operators may have a lower tap rate than non-operators, a higher swipe to tap ratio, and/or higher portion of interaction with particular applications, among others. By identifying patterns in labeled phone usage data, ML module 106 may train a model capable of predicting whether phone usage data indicates the user was operating a vehicle (e.g., by looking at the swipe to tap ratio, tap rate, etc. of a user's phone usage data).

In another embodiment, labeled training data 302 includes a label for whether a driving trip includes a "distracted driver" or "non-distracted driver". ML module 106 is configured to determine patterns in historical driving data that differ for distracted drivers and non-distracted drivers. For example, distracted drivers may have a higher number of sudden braking events per trip, higher variability in speed, and/or more unintended lane departures, among other features. By identifying patterns in labeled driving data, ML module 106 may train a model capable of predicting whether driving data indicates the driver was engages with a phone (e.g., by looking at the sudden braking events, speed variability, lane departures, etc. of a user's driving data).

In another embodiment, labeled training data 302 includes a label for whether potential distracted driving events are "passenger events" or "distracted driving events". ML module 106 is configured to determine patterns in potential distracted driving events that differ for passenger events and distracted driving events. For example, passenger events may include low correlation between phone usage (e.g. taps) and sudden braking events, high average tap rate during a trip, and/or use of a variety of apps during a trip, among other features. By identifying patterns in labeled potential distracted driving events, ML module 106 may train a model capable of predicting whether the phone usage data and driving data associated with a potential distracted driving event indicates the event is a passenger event or a distracted driving event (e.g., by looking at tap rate, correlation between taps and sudden braking events, etc. for a particular trip).

In the example embodiment, ML module 106 is configured to generate trained model 306 such that trained model 306 is capable of receive novel data inputs (e.g., driving data, phone usage data, and/or potential distracted driving events) and identifying whether the data are associated with distracted driving. Trip analysis module 108 is configured to receive trained model 306 from ML module 106 and use trained model 306 to analyze user data 308 (e.g., user driving data and user phone usage data).

In the example embodiment, trip analysis module 108 is configured to identify driving trips within user data 308, analyze and categorize the trips using trained model 306, and generate categorized trips 310. Categorized trips 310 include trips within user data 308 categorized (e.g., labeled or qualified) as being either a trip that included distracted driving or not. In alternative embodiments, categorized trips 310 include an amount of distracted driving per trip, an overall safety score for the trip, or any other information indicating the type or amount of distracted driving that occurred during the trip.

In the example embodiment, driver profile module 110 is configured to receive a plurality of categorized trips 310 from trip analysis module 108 and generate driver profile 312 based at least in part upon categorized trips 310. Driver profile module 110 is further configured to transmit and/or display driver profile 312 via user computer device 112 and/or insurance company computer device 118. In one embodiment, user data 308 may be similar to user driving data 216 and user phone usage data 218, categorized trips 310 may be similar to categorized events 220, driver profile 312 may be similar to driver profile 222, and the interaction between trip analysis module 108, user data 308, categorized trips 310, driver profile module 110, and driver profile 312 may be similar to the description provided with reference to FIG. 2.

Examples of Data Flow for Training a Machine Learning Model

Figure 4:
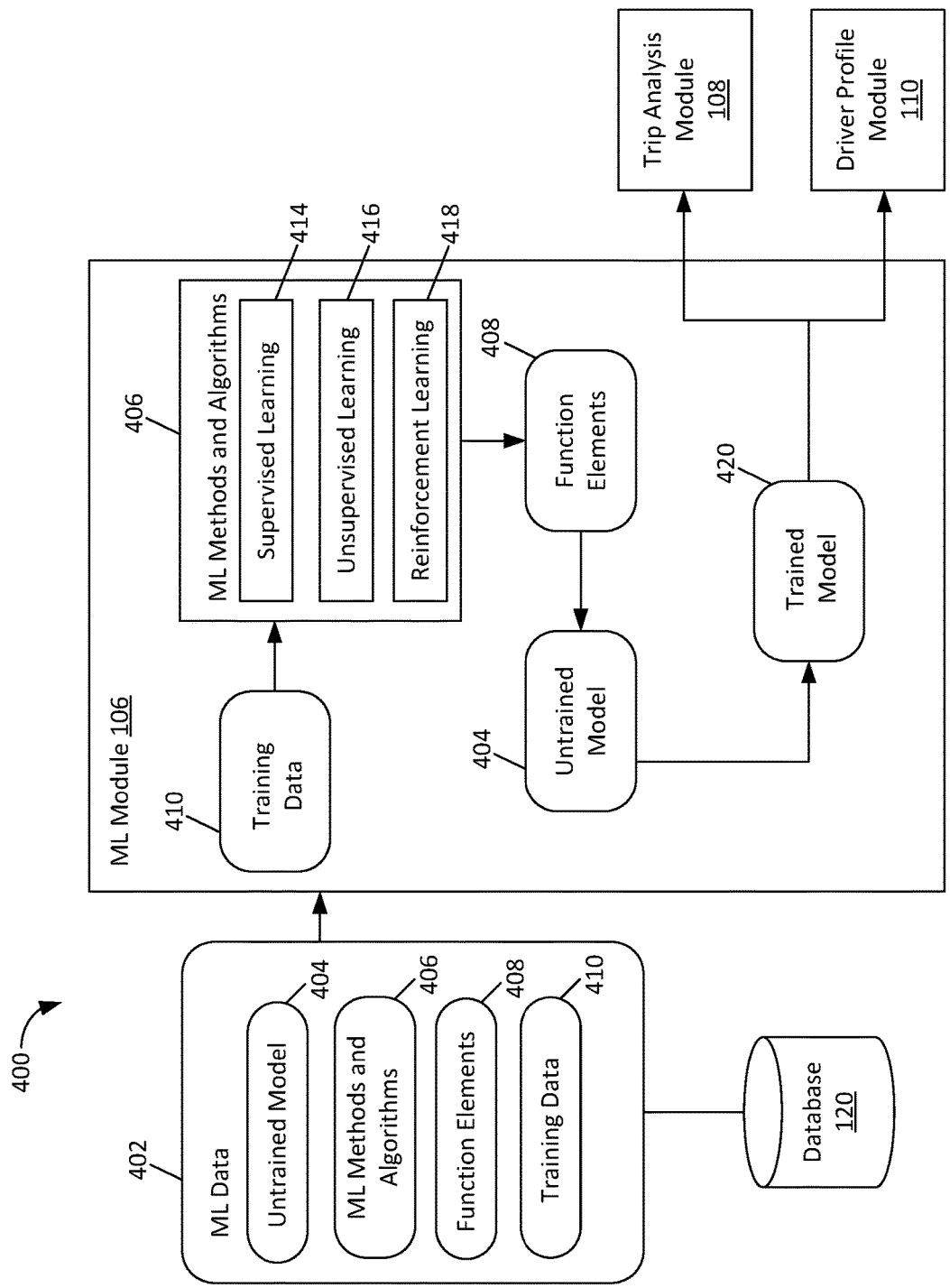
FIG. 4 illustrates a data flow for training a machine learning model using the DDA computer device of FIG. 1, according to various embodiments.

FIG. 4 illustrates a data flow 400 for training machine learning ("ML") module 106. In general, ML module 106 is utilized by distracted driving analysis ("DDA") computer device 102 (shown in FIG. 1) in order to help DDA computer device 102 "learn" to analyze, organize, and/or process data without being explicitly programmed. Specifically, ML module 106 is utilized by DDA computer device 102 to generate trained model 420, which is utilized by DDA computer device 102 to make decisions based at least in part upon processing certain inputs. In the exemplary embodiment, ML module 106 receives ML data 402 from database 120, and utilizes ML methods and algorithms 406 to generate trained decision models, such as trained model 420. ML module 106 is further configured to transmit trained model 420 to at least one of trip analysis module 108 and driver profile module 110, where trained model 420 may be used to assist in identifying distracted driving events, scoring driver safety, and/or building a driver profile.

In the exemplary embodiment, ML module 106 receives ML data 402 from database 120. ML data 402 includes, but is not limited to, untrained model 404, ML methods and algorithms 406, function elements 408, and training data 410. In alternative embodiments, training data 410 is labeled, partially labeled, or unlabeled data including historical data such as, but not limited to, historical phone usage data, historical driving data, and potential distracted driving events. ML module 106 utilizes ML methods and algorithms 406 to process training data 412 and generate function elements 408, which include coefficients and/or any other data elements associated with a function or a decision model. ML module 106 is configured to apply function elements 408 to untrained model 404 and generate trained model 420. Untrained model 404 may be any decision-making model or function with undefined or partially defined coefficients and/or function elements. ML module 106 is configured to transmit trained model 420 to trip analysis module 108 and/or driver profile module 110. In some embodiments, ML module 106 is configured to store trained model 420 in database 120.

In the exemplary embodiment, ML module 406 is configured to utilize ML methods and algorithms 406, which may include a variety of methods and algorithms such as: linear or logistic regression, instance-based algorithms, regularization algorithms, decision trees, Bayesian networks, cluster analysis, association rule learning, artificial neural networks, deep learning, dimensionality reduction, and support vector machines. ML methods and algorithms 406 are generally directed toward at least one of a plurality of categorizations of machine learning, including supervised learning methods 414, unsupervised learning methods 416, and reinforcement learning methods 418. ML module 106 is configured to apply ML methods and algorithms 406 to processes training data 402, which includes system data such as usage data, application response data, instructions data, and error log data, in order to determine function elements 408. In other words, ML module 106 uses ML methods and algorithms 406 determine, identify, or define relationships and/or patterns in training data 410, and generate function elements 408 describing those relationships and/or patterns. ML module 106 then uses function elements 408 to develop trained model 420 from untrained model 404.

In one embodiment, ML module 106 utilizes supervised learning methods 414, which involve defining relationships in organized and/or labeled data to make predictions about subsequently received data. Using supervised learning 414, ML module 106 receives training data 410 that includes training inputs and associated training outputs (e.g., labeled training data). For example, for a system attempting to identify distracted driving events, the training data may include a set of parameters (e.g., tap rate during a potential distracted driving event, a correlation between taps and sudden braking events, app usage, etc.) and an associated label specifying whether the parameters are associated with a distracted driving event or a passenger event. ML module 106 uses supervised learning methods 414 to process training data 410 and generate function elements 408 that, when applied to untrained model 404, effectively map outputs (e.g., passenger event or distracted driving event) to inputs (e.g., different sets of parameters).

In another embodiment, ML module 106 utilizes unsupervised learning methods 416, which involve finding meaningful relationships in unorganized data. Unlike supervised learning methods 414, unsupervised learning methods 416 do not utilize labeled training data. Rather, training data 410 is unorganized, and ML module 106 utilizes unsupervised learning methods 416 to determine or identify relationships within training data 410 and generate function elements 408 that, when applied to untrained model 404, effectively describe these relationships. For example, ML module 106 receives training data 410 that includes unorganized historical driving data and historical phone usage data, and ML module 106 may group the data points in clusters based at least in part upon similarities between parameters.

In another embodiment, ML module 106 utilizes reinforcement learning methods 418, which involve optimizing outputs based at least in part upon feedback from a reward signal. Specifically, reinforcement learning methods 418 include a user-defined reward signal definition, which provides a reward signal based at least in part upon an output generated by a decision-making model, such as untrained model 404 or trained model 420. The decision-making model receives a data input, generates an output, and receives a reward signal based at least in part upon the output. Reinforcement learning methods 418 are configured to adjust function elements 408 based at least in part upon the strength of the reward signal, so as to receive stronger rewards signals for subsequently received data inputs.

In the exemplary embodiment, regardless of the specific ML methods and algorithms 406 used to generate function elements 408, ML module 106 is configured to apply function elements 408 to untrained model 404 in order to generate trained model 420. ML module 106 is further configured to transmit trained model 420 to trip analysis module 108, driver profile module 110, database 120, and/or any memory local to DDA computer device 102.

Examples of User Computer Device

Figure 5:
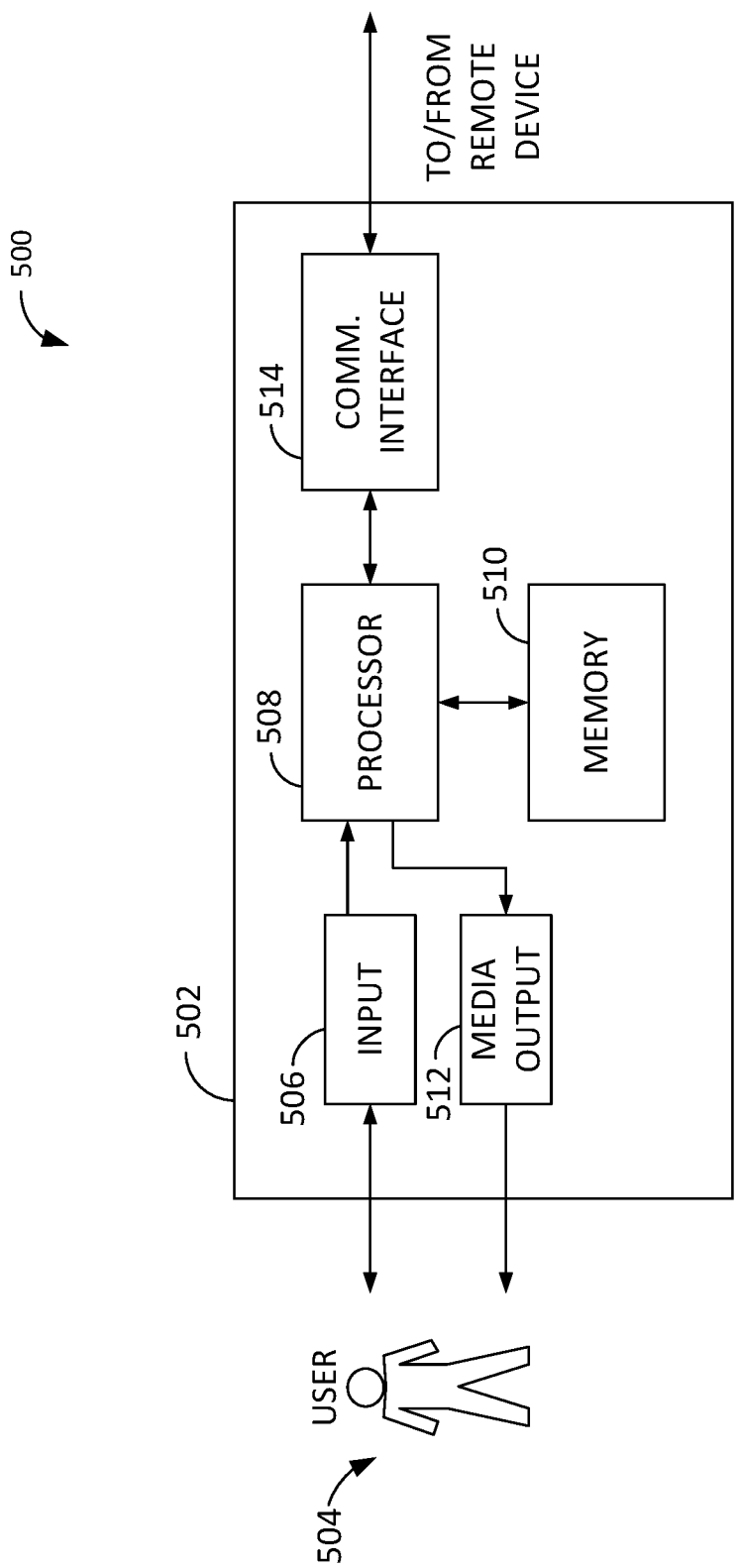
FIG. 5 illustrates a configuration for a user computer device included in the DDA computer system of FIG. 1, according to various embodiments.

FIG. 5 illustrates an example configuration 500 of an example user computing device 502, such as user computer device 112 and/or admin computer device 114 (shown in FIG. 1). In some embodiments, user computing device 502 is in communication with distracted driving analysis ("DDA") computing device, such as DDA computer device 102 (shown in FIG. 1). User computing device 502 may be representative of, but is not limited to user computer device 112, vehicle system 114, and insurance provider computer device 118. For example, user computing device 502 may be a smartphone, tablet, smartwatch, wearable electronic, laptop, desktop, vehicle computing device, dashboard computer, or another type of computing device associated with the account holder.

User computing device 502 may be operated by a user 504 (e.g., a user of distracted driving analysis ("DDA") system 100, shown in FIG. 1). User computing device 502 may receive input from user 504 via an input device 506. User computing device 502 includes a processor 508 for executing instructions. In some embodiments, executable instructions may be stored in a memory area 510. Processor 508 may include one or more processing units (e.g., in a multi-core configuration). Memory area 510 may be any device allowing information such as executable instructions and/or transaction data to be stored and retrieved. Memory area 510 may include one or more computer-readable media.

User computing device 502 also may include one media output component 512 for presenting information to user 504. Media output component 512 may be any component capable of conveying information to user 504. In some embodiments, media output component 512 may include an output adapter (not shown), such as a video adapter and/or an audio adapter. An output adapter may be operatively coupled to processor 508 and operatively coupleable to an output device, such as a display device (e.g., a cathode ray tube (CRT), liquid crystal display (LCD), light emitting diode (LED) display, or "electronic ink" display), an audio output device (e.g., a speaker or headphones), and/or a virtual reality or augmented reality device. In some embodiments, media output component 512 may be configured to present a graphical user interface (e.g., a web browser and/or a client application) to user 504.

In some embodiments, user computing device 502 may include input device 506 for receiving input from user 504. User 504 may use input device 506 to, without limitation, interact with DDA computing system 100 (e.g., using an app), DDA computer device 102, or any of user computer device 112, vehicle system 114, and insurance provider computer system 118 (shown in FIG. 1). Input device 506 may include, for example, a keyboard, a pointing device, a mouse, a stylus, a touch sensitive panel (e.g., a touch pad or a touch screen), and/or a virtual reality or augmented reality device. A single component, such as a touch screen, may function as both an output device of media output component 512 and input device 506. User computing device 502 may further include one sensor, including, for example, an audio input device, a video input device, a gyroscope, an accelerometer, a position detector, a biometric input device, and/or a telematics data collection device. In some embodiments, at least some data collected by user computing device 502 may be transmitted to DDA computer device 102.

User computing device 502 may also include a communication interface 514, communicatively coupled to any of DDA computer device 102, user computer device 112, vehicle system 114, and insurance provider computer system 118. Communication interface 514 may include, for example, a wired or wireless network adapter and/or a wireless data transceiver for use with a mobile telecommunications network.

Stored in memory area 510 may be, for example, computer-readable instructions for providing a user interface to user 504 via media output component 512 and, in certain examples, receiving and processing input from input device 506. The user interface may include, among other possibilities, a web browser and/or a client application. Web browsers enable users, such as user 504, to display and interact with media and other information typically embedded on a web page or a website hosted by DDA computer device 102 and/or user computing device 502. A client application may allow user 504 to interact with, for example, any of DDA computer device 102, user computer device 112, vehicle system 114, and insurance provider computer system 118. For example, instructions may be stored by a cloud service and the output of the execution of the instructions sent to the media output component 512.

Examples of Server Computing Device

Figure 6:
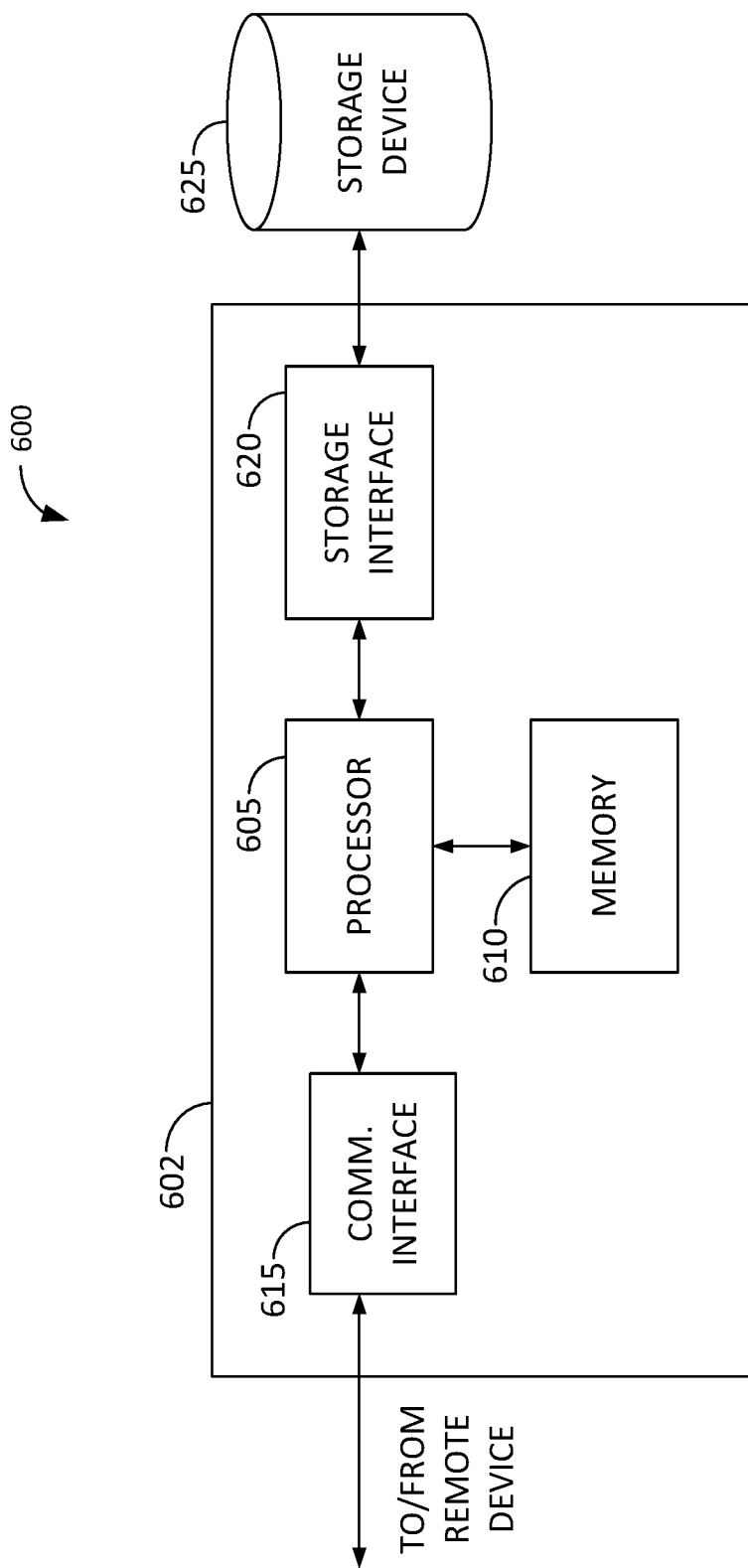
FIG. 6 illustrates a configuration for a server computing device included in the DDA computer system of FIG. 1, according to various embodiments.

FIG. 6 depicts an example configuration 600 of an example server computing device 602, in accordance with one embodiment of the present disclosure. Server computer device 602 may include, but is not limited to, DDA computer device 102 (shown in FIG. 1). Server computer device 602 may include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 602 may be capable of communicating with a remote device such as another server computer device 602 or a user computing device, such as user computing device 502 (shown in FIG. 5). For example, communication interface 605 may receive requests from or transmit requests to user computing device 402 via the Internet.

Processor 605 may also be operatively coupled to a storage device 625. Storage device 625 may be any computer-operated hardware suitable for storing and/or retrieving data, such as, but not limited to, data associated with messaging database 126 (shown in FIG. 1). In some embodiments, storage device 625 may be integrated in server computer device 602. For example, server computer device 602 may include one or more hard disk drives as storage device 625. In other embodiments, storage device 625 may be external to server computer device 602 and may be accessed by a plurality of server computer devices 602. For example, storage device 625 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Processor 605 executes computer-executable instructions for implementing aspects of the disclosure. In some embodiments, processor 605 may be transformed into a special purpose microprocessor by executing computer-executable instructions or by otherwise being programmed.

Examples of Database Configuration in a Distracted Driving Analysis System

Figure 7:
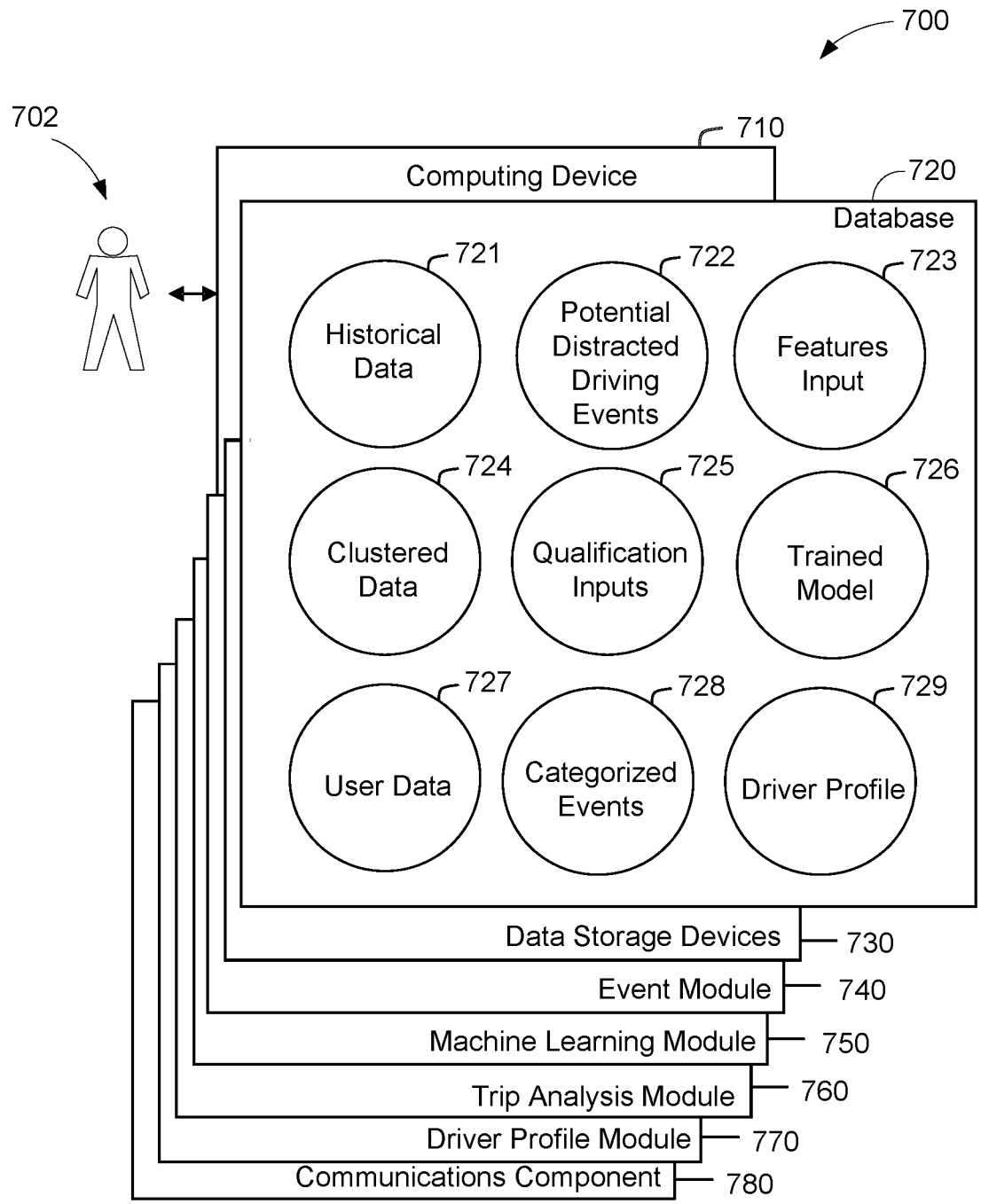
FIG. 7 illustrates a configuration of a database in communication with the DDA computer device of FIG. 1, according to various embodiments.

FIG. 7 depicts an exemplary configuration 700 of a database and other components in communication with a computing device 710 that may be used in a distracted driving analysis system, such as distracted driving analysis ("DDA") computer system 100 (shown in FIG. 1). In some embodiments, computing device 710 may be similar to DDA computer device 102 (shown in FIG. 1). Database 720 may be coupled with several separate components within computing device 710, which perform specific tasks. In the present embodiment, database 720 may include historical data 721, potential distracted driving events 722, features input 723, clustered data 724, qualification inputs 725, trained model 726, user data 727, categorized events 728, and driver profile 729. In some embodiments, database 720 is similar to database 120 (shown in FIG. 1).

Computing device 710 may include database 720, as well as data storage devices 730, which may be used, for example, for storing data, such any of the data mentioned herein, locally. Computing device 710 may also include event module 740, machine learning module 750, trip analysis module 760, driver profile module 770, and communications component 780, which may be utilized to implement the functionalities of an MA computer device as described herein.

Figure 8:
FIGS. 8-10 illustrate flow charts for computer implemented methods for identifying distracted driving events using the DDA computer system of FIG. 1, according to various embodiments.

Examples of Computer Implemented Methods for Identifying Distracted Driving Events FIG. 8 depicts a flow chart illustrating an example computer-implemented method 800 for identifying distracted driving events. In some embodiments, method 800 is carried out by DDA computer device 102 (shown in FIG. 1).

Method 800 includes receiving 802 driving event records. Each driving event record includes phone usage by a user that occurred within a time period of a driving event associated with the user. Method 800 further includes dividing 804 the driving event records into at least two clusters. The driving event records are divided 804 based at least in part upon common features of each driving event record by processing the driving event records using an unsupervised machine learning algorithm. A trained model is generated 806 based at least in part upon the at least two clusters including cluster labels, and a new driving event is processed 808 using the trained model. Method 800 further includes assigning 810 the new driving event to one of the at least two clusters using the trained model. Further, method 800 includes determining 812 whether the new driving event is an actual distracted driving event, or a passenger event based at least in part upon the cluster labels for the assigned cluster.

Figure 9:
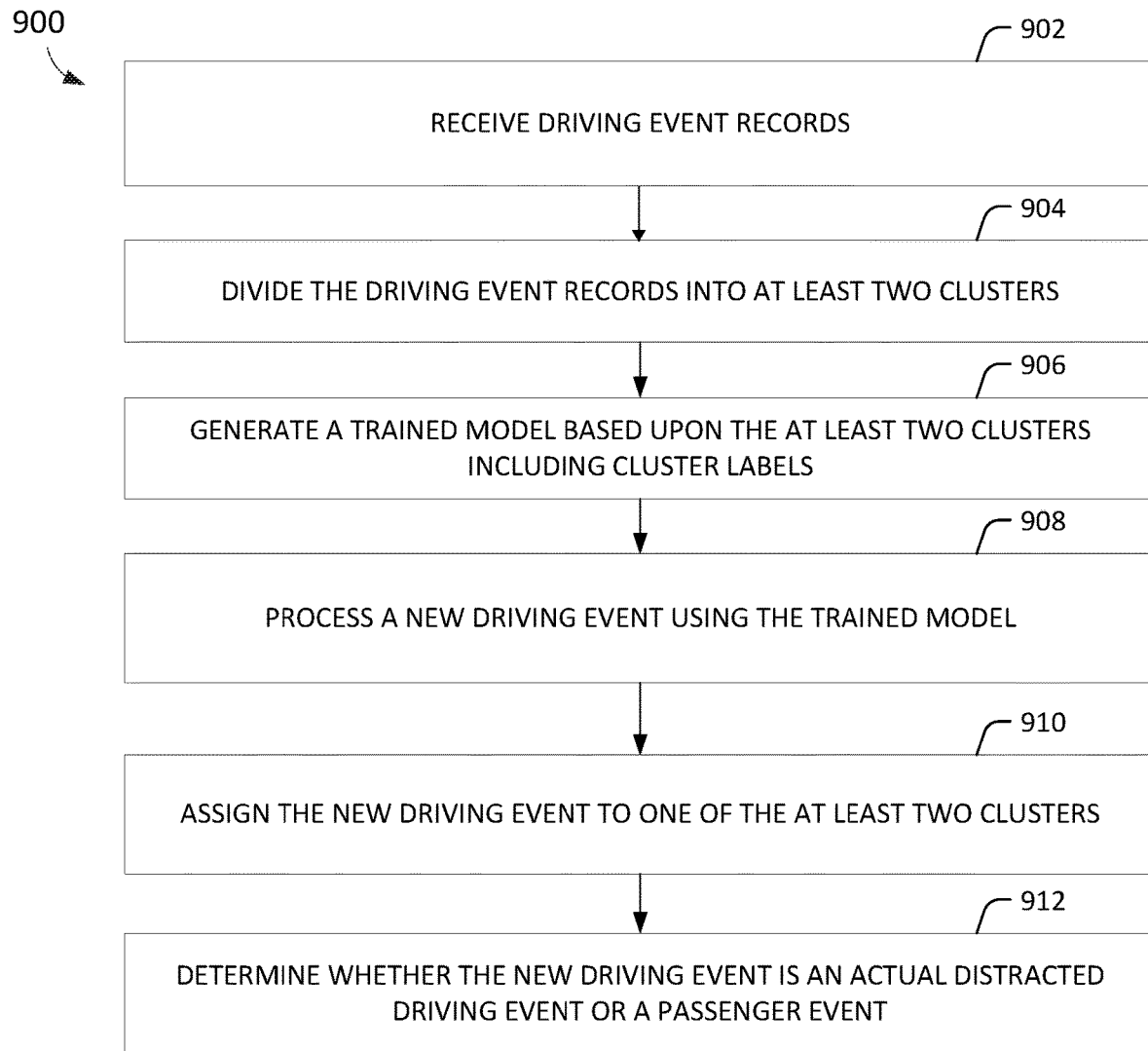

FIG. 9 depicts a flow chart illustrating an example computer-implemented method 900 for identifying distracted driving events. In some embodiments, method 900 is carried out by DDA computer device 102 (shown in FIG. 1).

Method 900 includes receiving 902 driving event records. Each driving event record includes phone usage by a user that occurred within a time period of a driving event associated with the user, and at least some of the driving event records are labeled as an actual distracted driving event or a passenger event. Method 900 further includes dividing 904 the driving event records into at least two clusters based at least in part upon common features and the labels of each driving event record by processing the plurality of driving event records with a semi-supervised machine learning algorithm. A trained model is generated 906 based at least in part upon the at least two clusters including cluster labels, and a new driving event is processed 908 using the trained model. The new driving event is assigned 910 to one of the at least two clusters using the trained model. Further, method 900 includes determining 912 whether the new driving event is an actual distracted driving event, or a passenger event based at least in part upon the cluster labels for the assigned cluster.

Figure 10:
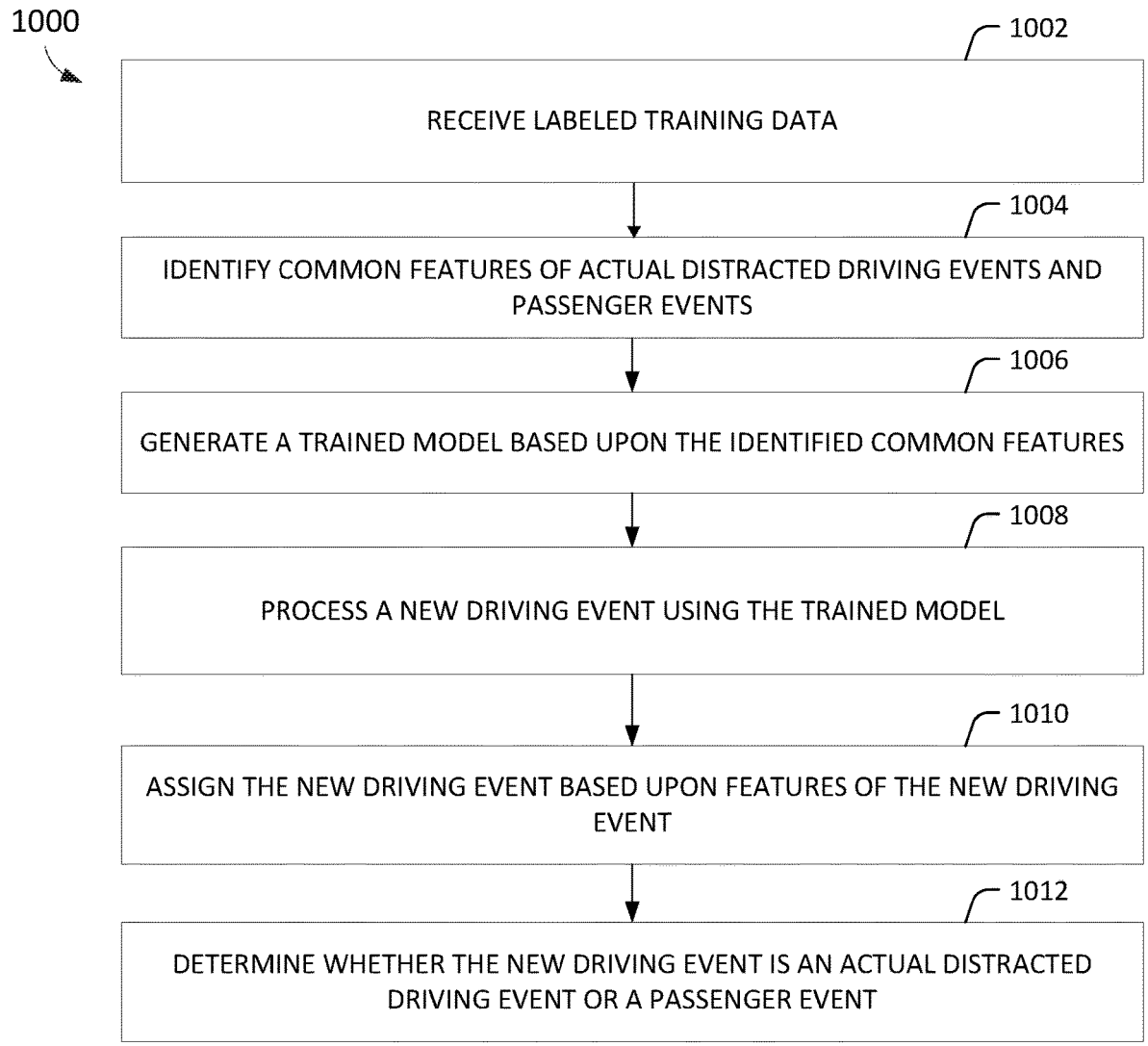

FIG. 10 depicts a flow chart illustrating an example computer-implemented method 1000 for identifying distracted driving events. In some embodiments, method 1000 is carried out by DDA computer device 102 (shown in FIG. 1).

Method 1000 includes receiving 1002 labeled training data. The labeled training data include driving event records labeled as actual distracted driving events or passenger events, and each driving event record includes phone usage by a user that occurred within a time period of a driving event associated with the user. Method 1000 further includes identifying 1004 common features of the actual distracted driving events and the passenger events by processing the training data using a supervised machine learning algorithm. A trained model is generated 1006 based at least in part upon the identified common features, and a new driving event is processed 1008 using the trained model. The new driving event is assigned 1010 based at least in part upon features of the new driving event using the trained model. Method 1000 further includes determining 1012 whether the new driving event is an actual distracted driving event, or a passenger event based at least in part upon the assignment.

Examples of Embodiments

In one embodiment, a distracted driving analysis system for identifying distracted driving events is provided. The system includes one processor in communication with at least one memory device, and the at least one processor is programmed to: (i) receive a plurality of driving event records, each driving event record including phone usage by a user that occurred within a time period of a driving event associated with the user, (ii) divide the plurality of driving event records into at least two clusters based at least in part upon common features of each driving event record by processing the plurality of driving event records using an unsupervised machine learning algorithm, (iii) generate a trained model based at least in part upon the at least two clusters including cluster labels, (iv) process a new driving event using the trained model, (v) assign the new driving event to one of the at least two clusters using the trained model, and (vi) based at least in part upon the cluster labels for the assigned cluster, determine whether the new driving event is an actual distracted driving event or a passenger event. The computer system may include additional, less, or alternate functionality, including that discussed elsewhere herein.

For example, the at least one processor may further be programmed to: (i) receive feature inputs from a user computer device, wherein the feature inputs indicate the common features of the driving event records that should be analyzed in order to categorize and label the driving event records, (ii) display information related to the at least two clusters to a user through the user computer device, and (iii) receive the cluster labels from the user computer device, the cluster labels indicating whether the driving event records in each cluster represent actual distracted driving events or passenger events.

The at least one processor may further be programmed to: (i) receive a new driving event associated with a second user, (ii) determine, using the trained model, whether the new driving event is an actual distracted driving event or a passenger event, (iii) assign a category to the new driving event as an actual distracted driving event or a passenger event, (iv) assign a confidence level to the category assigned to the new driving event, (v) generate a driver profile for the second user, wherein the driver profile includes the categorized new driving event, (vi) calculate a user safety score based at least in part upon the categorized new driving event, (vii) include the user safety score in the driver profile, (viii) generate an insurance policy based at least in part upon the driver profile, (ix) receive historical driving data including a plurality of driving trips associated with at least one user and historical phone usage data including a plurality of instances of phone usage associated with at least one user, (x) analyze the historical driving data and historical phone usage data, and/or (xi) determine a plurality of instances of phone usage by a user that occurred within the time period of a driving trip associated with the user.

In another embodiment, a distracted driving analysis system for identifying distracted driving events is provided. The system includes one processor in communication with at least one memory device, and the at least one processor is programmed to: (i) receive a plurality of driving event records, each driving event record including phone usage by a user that occurred within a time period of a driving event associated with the user, wherein at least one of the plurality of driving event records is labeled as an actual distracted driving event or a passenger event, (ii) divide the plurality of driving event records into at least two clusters based at least in part upon common features and the labels of each driving event record by processing the plurality of driving event records with a semi-supervised machine learning algorithm, (iii) generate a trained model based at least in part upon the at least two clusters including cluster labels, (iv) process a new driving event using the trained model, (v) assign the new driving event to one of the at least two clusters using the trained model, and/or (vi) based at least in part upon the cluster labels for the assigned cluster, determine whether the new driving event is an actual distracted driving event or a passenger event. The computer system may include additional, less, or alternate functionality, including that discussed elsewhere herein.

For example, the at least one processor may be further programmed to: (i) receive feature inputs from a user computer device, the features input indicate the common features of the driving event records to be analyzed using the semi-supervised machine learning algorithm, (ii) display information related to the at least two clusters to a user through the user computer device, the displayed information including the label of the at least one labeled driving event record, and/or (iii) receive the cluster labels from the user computer device, the cluster labels indicating whether the driving event records in each cluster represent actual distracted driving events or passenger events.

Further, the at least one processor may be further programmed to: (i) receive a new driving event associated with a second user, (ii) determine, using the trained model, whether the new driving event is an actual distracted driving event or a passenger event, (iii) assign a category to the distracted driving event as an actual distracted driving event or a passenger event, (iv) assign a confidence level to the category assigned to the new driving event, (v) generate a driver profile for the second user, wherein the driver profile includes the categorized new driving event, (vi) calculate a user safety score based at least in part upon the categorized new driving event, (vii) include the user safety score in the driver profile, (ix) generate an insurance policy based at least in part upon the driver profile, and/or (x) auto-encode and embed the driving event records.

In yet another embodiment, a distracted driving analysis system for identifying distracted driving events is provided. The system includes one processor in communication with at least one memory device, and the at least one processor is programmed to: (i) receive labeled training data, the labeled training data including a plurality of driving event records each labeled as an actual distracted driving event or a passenger event, wherein each driving event record includes phone usage by a user that occurred within a time period of a driving event associated with the user, (ii) identify common features of the actual distracted driving events and the passenger events by processing the training data using a supervised machine learning algorithm, (iii) generate a trained model based at least in part upon the identified common features, (iv) process a new driving event using the trained model, (v) assign the new driving event based at least in part upon features of the new driving event using the trained model, and/or (vi) based at least in part upon the assignment, determine whether the new driving event is an actual distracted driving event or a passenger event. The computer system may include additional, less, or alternate functionality, including that discussed elsewhere herein.

For example, the at least one processor may be further programmed to: (i) receive a new driving event associated with a second user, (ii) determine, using the trained model, whether the new driving event is an actual distracted driving event or a passenger event, (iii) assign a category to the new driving event as an actual distracted driving event or a passenger event, (iv) assign a confidence level to the category assigned to the new driving event, (v) generate a driver profile for the second user, wherein the driver profile includes the categorized new driving event, (vi) calculate a user safety score based at least in part upon the categorized new driving event, (vii) include the user safety score in the driver profile, and/or (viii) generate an insurance policy based at least in part upon the driver profile.

Further, the common features of the actual distracted driving events and the passenger events indicate how a user interacts with a user computing device of the user as a driver and as a passenger, and the features may include average tap rate, tap to swipe ratio, and phone usage correlated to acceleration events.

Examples of Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about driving environments, roadway features, roadway feature attributes, HD point clouds, image locations, drone locations, and camera angles.

Based at least in part upon these analyses, the processing element may learn how to identify characteristics and patterns that may then be applied to analyzing image data, model data, and/or other data. For example, the processing element may learn, with the user's permission or affirmative consent, to identify roadway features and assign feature attributes to those roadway features.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

I claim:

1. A distracted driving analysis system for identifying distracted driving events, the distracted driving analysis system comprising at least one processor in communication with at least one memory device, wherein the at least one processor is programmed to:
   receive a plurality of driving event records, each driving event record of the plurality of driving event records including phone usage by a user that occurred within a time period of a driving event associated with the user, wherein at least one of the plurality of driving event records is labeled as an actual distracted driving event or a passenger event;
   divide the plurality of driving event records into at least two clusters based at least in part upon common features of one or more driving event records of the plurality of driving event records and the label of the at least one driving event record by processing the plurality of driving event records with a semi-supervised machine learning algorithm;
   generate a trained model based at least in part upon the at least two clusters including cluster labels;
   process a new driving event using the trained model;
   assign the new driving event to one of the at least two clusters using the trained model; and
   based at least in part upon the cluster labels for the assigned cluster, determine whether the new driving event is an actual distracted driving event or a passenger event.

2. The system of claim 1, wherein the at least one processor is further programmed to:
   receive a feature input from a user computer device, the feature input indicate the common features of the driving event records to be analyzed using the semi-supervised machine learning algorithm;
   display information related to the at least two clusters to a user through the user computer device; and
   receive the cluster labels from the user computer device, the cluster labels indicating whether the driving event records in each cluster represent actual distracted driving events or passenger events.

3. The system of claim 1, wherein the at least one processor is further programmed to:
   receive a new driving event associated with a second user;
   determine, using the trained model, whether the new driving event is an actual distracted driving event or a passenger event; and
   assign a category to the distracted driving event as an actual distracted driving event or a passenger event.

4. The system of claim 3, wherein the at least one processor is further programmed to assign a confidence level to the category assigned to the new driving event.

5. The system of claim 4, wherein the at least one processor is further programmed to generate a driver profile for the second user, wherein the driver profile includes the categorized new driving event.

6. The system of claim 5, wherein the at least one processor is further programmed to:
calculate a user safety score based at least in part upon the categorized new driving event; and
include the user safety score in the driver profile.

7. The system of claim 6, wherein the at least one processor is further programmed to generate an insurance policy based at least in part upon the driver profile.

8. The system of claim 1, wherein the at least one processor is further configured to auto-encode and embed the driving event records.

9. A computer-implemented method for identifying distracted driving events using a distracted driving analysis system including one processor in communication with at least one memory device, the method comprising:
receiving a plurality of driving event records, each driving event record of the plurality of driving event records including phone usage by a user that occurred within a time period of a driving event associated with the user, wherein at least one of the plurality of driving event records is labeled as an actual distracted driving event or a passenger event;
dividing the plurality of driving event records into at least two clusters based at least in part upon common features of one or more driving event records of the plurality of driving event records and the label of the at least one driving event record by processing the plurality of driving event records with a semi-supervised machine learning algorithm;
generating a trained model based at least in part upon the at least two clusters including cluster labels;
processing a new driving event using the trained model;
assigning the new driving event to one of the at least two clusters using the trained model; and
based at least in part upon the cluster labels for the assigned cluster, determining whether the new driving event is an actual distracted driving event or a passenger event.

10. The computer-implemented method of claim 9 further comprising:
receiving a feature input from a user computer device, the feature input indicate the common features of the driving event records to be analyzed using the semi-supervised machine learning algorithm;
displaying information related to the at least two clusters to a user through the user computer device; and
receiving the cluster labels from the user computer device, the cluster labels indicating whether the driving event records in each cluster represent actual distracted driving events or passenger events.

11. The computer-implemented method of claim 9 further comprising:
receiving a new driving event associated with a second user;
determining, using the trained model, whether the new driving event is an actual distracted driving event or a passenger event; and
assigning a category to the distracted driving event as an actual distracted driving event or a passenger event.

12. The computer-implemented method of claim 11 further comprising assigning a confidence level to the category assigned to the new driving event.

13. The computer-implemented method of claim 12 further comprising generating a driver profile for the second user, wherein the driver profile includes the categorized new driving event.

14. The computer-implemented method of claim 13 further comprising:
calculating a user safety score based at least in part upon the categorized new driving event; and
including the user safety score in the driver profile.

15. The computer-implemented method of claim 14 further comprising generating an insurance policy based at least in part upon the driver profile.

16. A non-transitory computer-readable storage medium having computer-executable instructions embodied thereon, wherein when executed by a distracted driving analysis system including one processor in communication with at least one memory device, the computer-executable instructions cause the at least one processor to:
receive a plurality of driving event records, each driving event record of the plurality of driving event records including phone usage by a user that occurred within a time period of a driving event associated with the user, wherein at least one of the plurality of driving event records is labeled as an actual distracted driving event or a passenger event;
divide the plurality of driving event records into at least two clusters based at least in part upon common features of one or more driving event records of the plurality of driving event records and the label of the at least one driving event record by processing the plurality of driving event records with a semi-supervised machine learning algorithm;
generate a trained model based at least in part upon the at least two clusters including cluster labels;
process a new driving event using the trained model;
assign the new driving event to one of the at least two clusters using the trained model; and
based at least in part upon the cluster labels for the assigned cluster, determine whether the new driving event is an actual distracted driving event or a passenger event.

17. The non-transitory computer-readable storage medium of claim 16, wherein the computer-executable instructions further cause the at least one processor to:
receive a feature input from a user computer device, the feature input indicate the common features of the driving event records to be analyzed using the semi-supervised machine learning algorithm;
display information related to the at least two clusters to a user through the user computer device; and
receive the cluster labels from the user computer device, the cluster labels indicating whether the driving event records in each cluster represent actual distracted driving events or passenger events.

18. The non-transitory computer-readable storage medium of claim 16, wherein the computer-executable instructions further cause the at least one processor to:
receive a new driving event associated with a second user;
determine, using the trained model, whether the new driving event is an actual distracted driving event or a passenger event; and
assign a category to the distracted driving event as an actual distracted driving event or a passenger event.

19. The non-transitory computer-readable storage medium of claim 18, wherein the computer-executable instructions further cause the at least one processor to assign a confidence level to the category assigned to the new driving event.

20. The non-transitory computer-readable storage medium of claim 19, wherein the computer-executable instructions further cause the at least one processor to generate a driver profile for the second user, wherein the driver profile includes the categorized new driving event.

\* \* \* \* \*